(12) United States Patent
Vargas et al.

(10) Patent No.: US 10,380,335 B1
(45) Date of Patent: *Aug. 13, 2019

(54) SYSTEMS AND METHODS FOR PROVIDING SECURITY TO A HOST ENDPOINT DEVICE

(71) Applicant: Security Together Corporation, Roseville, CA (US)

(72) Inventors: Anthony Joseph Vargas, Roseville, CA (US); Kenneth Tallo, El Dorado Hills, CA (US); Andrew George Harvey, Pleasanton, CA (US); David Brian Petree, Sacramento, CA (US); Thomas John Newman, Discovery Bay, CA (US)

(73) Assignee: Security Together Corporation, Roseville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/958,829

(22) Filed: Apr. 20, 2018

Related U.S. Application Data

(63) Continuation-in-part of application No. 15/913,259, filed on Mar. 6, 2018, now Pat. No. 10,216,924, (Continued)

(51) Int. Cl.
| | |
|---|---|
| *G06F 21/00* | (2013.01) |
| *G06F 21/50* | (2013.01) |
| *H04L 29/06* | (2006.01) |
| *G06F 21/71* | (2013.01) |
| *G06F 21/42* | (2013.01) |
| *G06F 21/78* | (2013.01) |

(52) U.S. Cl.
CPC .............. *G06F 21/50* (2013.01); *G06F 21/42* (2013.01); *G06F 21/71* (2013.01); *G06F 21/78* (2013.01); *H04L 63/145* (2013.01)

(58) Field of Classification Search
None
See application file for complete search history.

(56) References Cited

U.S. PATENT DOCUMENTS

| | | |
|---|---|---|
| 5,892,900 A | 4/1999 | Ginter |
| 5,918,194 A | 6/1999 | Banaska |

(Continued)

*Primary Examiner* — Andrew J Steinle
(74) *Attorney, Agent, or Firm* — Inventive Law Inc.; Jim H. Salter

(57) ABSTRACT

In various example embodiments disclosed herein, a Dynamic Security Architecture Environment (DSAE) security architecture is provided in an externally connectable endpoint device (the security device), which can be connected to an existing host endpoint device, such as a computer, laptop, tablet, phone, vehicle, medical device, Industrial Control System (ICS), or other electronic or Internet connected device. The example embodiments can implement the DSAE security architecture in the security device that connects to a host endpoint device to make the host endpoint device more secure by enabling the security device to combat cyber attacks targeted toward the host device. The example embodiments described herein also provide details for creating a security device that leverages the DSAE architecture, wherein the security device is configured to connect via a wired or wireless medium for data communication with a host endpoint device to make the host device more secure.

46 Claims, 18 Drawing Sheets

Related U.S. Application Data which is a continuation-in-part of application No. 14/800,579, filed on Jul. 15, 2015, now Pat. No. 9,928,359.

(56) References Cited

U.S. PATENT DOCUMENTS

| | | |
|---|---|---|
| 7,890,925 B1 | 2/2011 | Wyatt |
| 8,904,188 B2 | 12/2014 | Maheshwari |
| 2004/0184610 A1 | 9/2004 | Campbell |
| 2007/0174400 A1 | 7/2007 | Cai |
| 2007/0291767 A1 | 12/2007 | Smith |
| 2008/0126260 A1* | 5/2008 | Cox ........................ G06Q 20/20 705/67 |
| 2010/0310068 A1 | 12/2010 | Fischer |
| 2011/0271112 A1 | 11/2011 | Bajko |
| 2011/0302646 A1 | 12/2011 | Ronda |
| 2013/0283296 A1 | 10/2013 | Brown |
| 2014/0211816 A1* | 7/2014 | Ekner ................... H04L 7/0331 370/503 |
| 2014/0325239 A1 | 10/2014 | Ghose |
| 2016/0065612 A1* | 3/2016 | Evans ..................... G06F 21/53 726/22 |
| 2016/0232358 A1 | 8/2016 | Grieco |

\* cited by examiner

US 10,380,335 B1

SYSTEMS AND METHODS FOR PROVIDING SECURITY TO A HOST ENDPOINT DEVICE

PRIORITY PATENT APPLICATIONS

This is a non-provisional continuation-in-part (CIP) patent application claiming priority to U.S. patent application Ser. No. 15/913,259, filed Mar. 6, 2018; which claims priority to U.S. patent application Ser. No. 14/800,579, filed Jul. 15, 2015. This non-provisional CIP patent application claims priority to the referenced patent applications. The entire disclosure of the referenced patent applications is considered part of the disclosure of the present application and is hereby incorporated by reference herein in its entirety.

TECHNICAL FIELD

The disclosed subject matter relates to the field of computing systems, data processors, multi-processor systems, operating systems, and data security systems, and particularly although not exclusively, to systems and methods for providing security to a host endpoint device.

COPYRIGHT

A portion of the disclosure of this patent document contains material that is subject to copyright protection. The copyright owner has no objection to the facsimile reproduction of the patent document or the patent disclosure, as it appears in the U.S. Patent and Trademark Office patent files or records, but otherwise reserves all copyright rights whatsoever. The following notice applies to the disclosure provided herein and to the drawings that form a part of this document: Copyright 2016-2018, Security Together Corporation; All Rights Reserved.

BACKGROUND

Today's current electronic system architectures have inherent deficiencies that make defending against cyber attacks extremely difficult and many times impossible. Current electronic architectures are limited in how they can deal with an ever changing array of attacks. Companies focus on making networks or endpoint devices more secure. Unfortunately, this strategy can only go so far as the platforms and architectures that these networks and endpoint devices rely on are insecure.

SUMMARY

Described are architectures, systems, processes and methods for security that, at their core, are adaptive and changing at determined intervals so as to present a different environment, a portion of which is a varied attack surface, to the communications world exterior to the system.

In one aspect is described improved security architecture, system and methods based upon multiple processors, operating systems and communication channels, in which at least some processors each perform as an input system connectable to a network, and are dissimilar in some manner, the manner of dissimilarity being controlled by a control system that is not connected to the network. Additionally in this aspect, an execution system is included which performs execution based upon received inputs to the input system, which are passed to the execution system once validated as being safe and not compromised.

In another aspect, a multi-channel internal bus is provided that includes parallel communication lines and exists to provide an even more secure environment.

In another aspect, the described architectures, systems, processes and methods for security are provided to create a security device that connects to a host endpoint device, wherein the security device protects the host endpoint device from cyber attacks targeted against the host device. The host endpoint device or host device is also denoted herein as an endpoint. The example embodiments described herein provide details for implementing a Dynamic Security Architecture Environment (DSAE) security architecture in an externally connectable endpoint device (denoted herein as the security device), which can be connected to an existing host endpoint device, such as a computer, laptop, tablet, phone, vehicle, medical device, Industrial Control System (ICS), or other electronic or Internet connected device. The example embodiments described herein also provide details for implementing the DSAE security architecture in the security device that connects to a host endpoint device to make the host endpoint device more secure by enabling the security device to combat cyber attacks targeted toward the host device. The example embodiments described herein also provide details for creating a security device that leverages the DSAE architecture, wherein the security device is configured to connect via a wired or wireless medium for physical communication with a host endpoint device (and communicate logically via software between the host device and the secure device) to make the host device more secure.

In the DSAE security architecture, the Operational System (operational system) is also sometimes referred to as the Control System (control system). An operational processor is also called a control processor.

BRIEF DESCRIPTION OF THE DRAWINGS

These and other aspects and features of the described example embodiments will become apparent to those of ordinary skill in the art upon review of the following description of example embodiments of the invention in conjunction with the accompanying figures, wherein.

DETAILED DESCRIPTION

Figure 1:
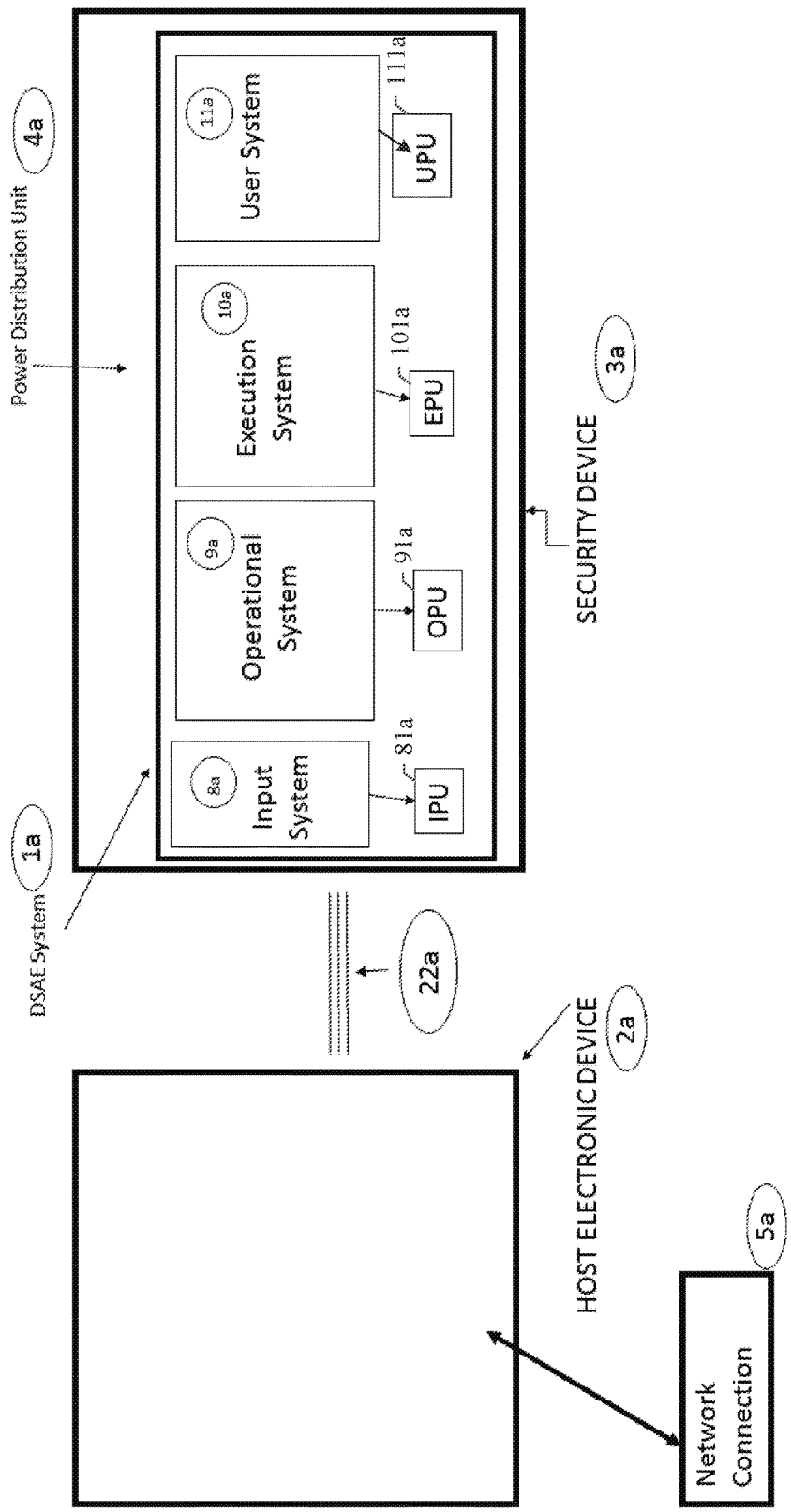
FIG. 1 illustrates an example embodiment comprising a host endpoint device connected to a security device via at least one wired or wireless medium or interface, wherein the security device can include and use a Dynamic Security Architecture Environment (DSAE) security architecture to provide security for the host endpoint device.

In the following detailed description, reference is made to the accompanying drawings that form a part hereof, and in which are shown, by way of illustration, specific embodiments in which the disclosed subject matter can be practiced. It is understood that other embodiments may be utilized and structural changes may be made without departing from the scope of the disclosed subject matter.

The described Dynamic Security Architecture Environment (DSAE), in which there is component isolation, is also referred to as a DSAE system, keeps attackers at bay by shifting and changing the attack surface so that an attack is much more difficult to occur on the DSAE system, as it is much more difficult to attack a system when you don't know what you are attacking and when the attack surface is continuously changing.

Aspects described in further detail herein are that the DSAE system is based on a modular architecture in which the input system is hardware isolated from the execution system running an application, and a control system that interfaces between the input system and the execution system is not only hardware isolated from both the input system and the execution system, but is also not directly connectable to the external network.

The DSAE architecture described further hereinafter puts in place periodic checks and balances. This is different than conventional architectures in the industry because it is a combined architecture, hardware, software, and process solution. Current systems have limited protections, which by themselves have been able to be compromised, which has led to a system compromise and thus a loss of availability.

As mentioned previously, the DSAE architecture allows for the attack surface to be continually varied. Contrast this with current endpoint devices where an attacker will know the specific attack surface, for example the attacker will know the common Internet browser and applications based on the operating system. So the attacker will know the likely attack surface and hence the attacks which will likely be successful. When running with the DSAE architecture, the adversaries don't know exactly what the environment is expected to be or what operating system and applications are running. The DSAE architecture is also unique in that it has the ability to make intelligent decisions in real time so it reduces the possibility of a single point of failure in the environment.

In one particular aspect, the DSAE architecture has the ability to make inquiries about the input units. After receiving answers to those inquiries, the system is able to determine the best environment to run a particular application or input message or file. A DSAE system also obtains forensics about the input so that an attack can be evaluated for purposes of evidence.

In addition to determining the safest and most secure execution environment, the DSAE architecture will dynamically assign risk levels so when an input unit requests a specific service the system is able to use historical baselines and customer-determined parameters to make instantaneous decisions on whether and where to run an input unit. Example outcomes are to run in a hardware-isolated environment, to run on multiple hardware-isolated environments or run in an environment which has network access. In addition, more questions can be asked and the environment continually changing, implying a constantly-shifting attack surface. With this changing attack surface an attack that just worked a moment before will likely not succeed a moment later. A DSAE system provides a static risk score and a dynamic risk awareness score. This provides a constant evaluation of the riskiness of certain activities on a DSAE system, and thus can help drive accountability.

Some attacks may not run immediately but rather might be delayed for a certain period of time. When a delayed attack is initially injected into the system it interrogates the hardware and software components at that point in time and determines the attack will be successful. Due to the changing state of the system, when the attack is launched the hardware and software components are likely to be different and therefore the attack will most likely fail.

The DSAE architecture will also track authentication credentials for users and those credentials will be offloaded from the operating system running the authentication. With this offloading, there is limited ability to compromise the credentials eliminating certain types of attacks against the system. Privilege escalations attacks are harder to implement against a DSAE system due to a separation of heightened privileges. Additionally, a DSAE system can create and store dynamically generated passwords so that passwords on a DSAE system always change dynamically without the need for the user to know of all the passwords.

As background, it is important to note that with multiple isolated processors (processors that reside on hardware modules) as described herein, substantially real-time determinations can take place regarding whether the system has been compromised, such that within seconds of an attack beginning, counter steps can be taken to address it. As such, the DSAE architecture has, in embodiments described, this characteristic. On systems without multiple isolated hardware processors, a system has no way to determine in real time whether it has been compromised. Once code loads and executes on a non-isolated chip there is no way for that processor to determine if it is running compromised or malicious code. A DSAE system has the checks and balances so that no, one, single compromise of an isolated processor can bring down the entire system. Other processors will watch the running chip to make sure any compromise is contained, which is particularly useful within Internet of Things (IoT) devices and environments.

With the DSAE architecture in place in a system, there is also the ability to provide a DSAE Assurance Score: This term means providing scores dynamically so the end user or administrator knows the riskiness of their current behavior. The score is calculated both dynamically and statically. The score is computed statically by the organization, data owner or organizational policies for certain tasks. Each task receives a static risk assurance score, which determines allowed DSAE configurations that get created by the use of different DSAE Ingredients. DSAE Ingredients have both static initial DSAE Assurance Scores that get generated based on the scores of known components. After a base DSAE Configuration is created using DSAE Ingredients the score is further calculated based on dynamic variables to the environment, user accounts, tasks, functional workflows, etc. If a DSAE Assurance Score cannot be achieved, a workflow or task will not run without a third-party intervention. One principle of a DSAE machine is that other hardware modules in the system monitor whether a process compromises a system (and thus the availability of the system). The DSAE Architecture is more than just High-Availability (HA) because it uses stored historical information and dynamic runtime information that is accessed by a different hardware component to determine if a processor was compromised and thus unavailable.

One principle of a DSAE machine is that other hardware modules in the system monitor whether a processes compromises a system (and thus the availability of the system). The DSAE Architecture is more than just High-Availability (HA) because it uses stored historical information that is accessed by a different hardware component to determine if a processor was compromised and thus unavailable.

Systems and Methods for Providing Security to a Host Endpoint Device

In various example embodiments, the DSAE security architecture was designed to combat and defeat cyber attacks. In a DSAE security architecture, a user could be a human or other animal species, another computer or machine or an automated computer program. In another aspect, the described architectures, systems, processes and methods for security are provided to create a security device that connects to a host endpoint device, wherein the security device protects the host endpoint device from cyber attacks targeted against the host device. The host endpoint device or host device is also denoted herein as an endpoint. The example embodiments described herein provide details for implementing a Dynamic Security Architecture Environment (DSAE) security architecture in an externally connectable endpoint device (the security device), which can be connected to an existing host endpoint device, such as a computer, laptop, tablet, phone, vehicle, medical device, Industrial Control System (ICS), or other electronic or Internet connected device. The example embodiments described herein also provide details for implementing the DSAE security architecture in the security device that connects to a host endpoint device to make the host endpoint device more secure by enabling the security device to combat cyber attacks targeted toward the host device. The example embodiments described herein also provide details for creating a security device that leverages the DSAE architecture, wherein the security device is configured to connect via a wired or wireless medium for data communication with a host endpoint device to make the host device more secure.

In an endpoint device that uses the DSAE security architecture, by design the logical systems (Input, Operational, Execution, and User systems) of the DSAE architecture operate on one or more isolated hardware modules (processing units). In a DSAE system that only has one hardware module per logical DSAE system, a DSAE system has the ability to run some components (such as heartbeats, some process state information) in an advanced logical software state to keep the full DSAE system available, which causes the DSAE security architecture logical systems (User, Input, Execution, and Operational) out of DSAE hardware isolation mode and also causes the DSAE logical systems (User, Input, Execution, and Operational) to cross logical system boundaries. This is not an ideal embodiment of the DSAE security architecture.

Referring now to FIG. 1, the DSAE security architecture of an example embodiment comprises a DSAE system 1a including a plurality of logical software systems: an Input System (FIG. 1, 8a), an Execution System (FIG. 1, 10a), a User System (FIG. 1, 11a), and an Operational System (also sometimes referred to as the Control System) (FIG. 1, 9a). The example embodiment also includes hardware processing modules: IPU (Input Processing Unit) 81a, OPU (Operational Processing Unit) 91a, EPU (Execution Processing Unit) 101a, and UPU (User Processing Unit) 111a. The IPU 81a, OPU 91a, EPU 101a, and UPU 111a are also called processing modules. The components of the DSAE system 1a can reside on electrical boards that contain the processing units/processing modules, which are the physical components of the DSAE security architecture. The DSAE system (FIG. 1, 1a) is a collection of all those hardware processing modules, which can include the logical DSAE systems (User System 11a, Operational System 9a, Input System 8a, and Execution System 10a), which yield a secure endpoint device that is tamper resistant, and able to defeat cyber attacks. The DSAE security architecture can be implemented on many different types of endpoint devices. The example embodiment of the DSAE system 1a shown in FIG. 1 contains both logical, and physical components. Together, the logical and physical components create a new system that connects to a host device.

Referring again to FIG. 1, an example embodiment comprises a host endpoint device 2a (such as a computer, laptop, tablet, phone, car, medical device, Industrial Control System (ICS) or other electronic or Internet connected device), connected to a security device 3a via at least one wired or wireless medium or interface 22a that the host device 2a can use to communicate with the security device 3a. As shown in FIG. 1, the security device 3a can include and use a DSAE security architecture implemented as DSAE system 1a described above. In the example embodiment of FIG. 1, the DSAE security architecture includes logical software systems, Operational System 9a, Execution System 10a, Input System 8a, and User System 11a and their corresponding physical hardware modules, Input Processing Unit (IPU) 81a, Execution Processing Unit (EPU) 101a, Operational Processing Unit (OPU) 91a, and User Processing Unit (UPU) 111a, each of which reside inside the security device 3a. The host endpoint device 2a can pass data to the security device 3a via interface 22a for security processing via the system components on the security device 3a. Software on the host device 2a allows the host device 2a to communicate with the security device 3a. In the example embodiment, an I/O subsystem on the host device 2a can be used to connect the host device 2a to an external network via a network connection or interface 5a. The security device 3a can receive power from an external power source, such as a power distribution unit 4a, which powers the DSAE hardware processing modules (Input Processing Unit (IPU) 81a, Execution Processing Unit (EPU) 101a, Operational Processing Unit (OPU) 91a, and User Processing Unit (UPU) 111a) of the security device 3a. Alternatively, the security device 3a can receive power from the host endpoint device 2a via interface 22a.

When the host endpoint device 2a passes data to the security device 3a via interface 22a for security processing, the security device 3a can validate the host device 2a data and provide an appropriate response as described in the above-referenced priority patent applications. In general, the security device 3a includes the Operational System 9a, which provides the operational, administration, and management of the security device 3a. The Execution System 10a provides the platform/infrastructure for application execution on the security device 3a. The Input System 8a provides the physical network and peripheral device connections for the security device 3a to the external environment, such as the host endpoint device 2a. The User System 11a provides a higher-level abstraction than that of a traditional "windows" user interface for the security device 3a. The User System 11a also includes a Security Terminal, which can act as the main interface for security administration and maintenance. A communication system or multichannel communications bus provides the internal multichannel communication lines to transmit data, internal messages, and control information along different internal parallel paths within the security device 3a.

The security device 3a can validate the host device 2a data, provide a safe execution environment, and provide an appropriate response to the host device 2a. Additional details of the processing performed in the DSAE system 1a environment on the security device 3a are provided in the above-referenced priority patent applications.

Figure 2:
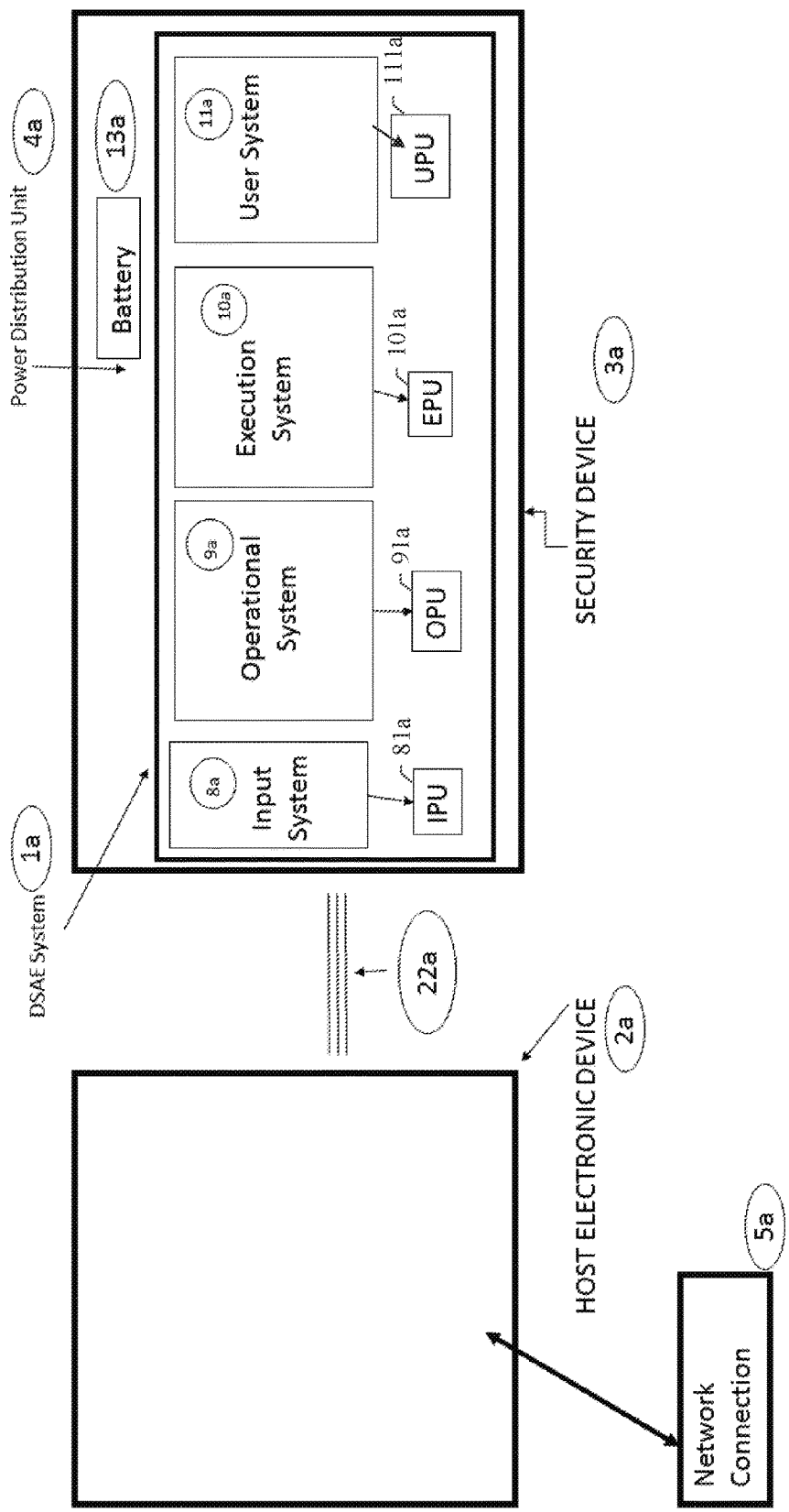
FIG. 2 illustrates an example embodiment comprising a host endpoint device connected to a security device via at least one wired or wireless medium or interface, wherein the security device can include and use a Dynamic Security Architecture Environment (DSAE) security architecture to provide security for the host endpoint device, the security device being configured to receive power from an external power distribution unit or a battery inside the security device, which powers the DSAE hardware processing modules (Input Processing Unit, Execution Processing Unit (EPU), Operational Processing Unit (OPU) or User Processing Unit (UPU) of the security device.

FIG. 2 illustrates an example embodiment of a system comprising a host endpoint device 2a (such as a computer, laptop, tablet, phone, car, medical device, Industrial Control System (ICS) or other electronic or Internet connected device), connected to a security device 3a via at least one wired or wireless medium or interface 22a that the host device 2a can use to communicate with the security device 3a. Similar to the embodiment shown in FIG. 1, the example embodiment illustrated in FIG. 2 includes the security device 3a that can include and use a DSAE security architecture implemented as DSAE system 1a described above. In the example embodiment of FIG. 2, the DSAE security architecture includes logical software systems, Operational System 9a, Execution System 10a, Input System 8a, and User System 11a and their corresponding physical hardware modules, Input Processing Unit (IPU) 81a, Execution Processing Unit (EPU) 101a, Operational Processing Unit (OPU) 91a, and User Processing Unit (UPU) 111a, each of which reside inside the security device 3a. The host endpoint device 2a can pass data to the security device 3a via interface 22a for security processing via the system components on the security device 3a as described above. Software on the host device 2a allows the host device 2a to communicate with the security device 3a. In the example embodiment, an I/O subsystem on the host device 2a can be used to connect the host device 2a to an external network via a network connection or interface 5a. The security device 3a can receive power from an external power source, such as a power distribution unit 4a, which powers the DSAE hardware processing modules (Input Processing Unit (IPU) 81a, Execution Processing Unit (EPU) 101a, Operational Processing Unit (OPU) 91a, and User Processing Unit (UPU) 111a) of the security device 3a. Alternatively, the security device 3a can receive power from the host endpoint device 2a via interface 22a. In the example embodiment of FIG. 2, the security device 3a can also receive power from an external power distribution unit 4a or a battery 13a inside the security device 3a, which powers the DSAE hardware processing modules (Input Processing Unit (IPU) 81a, Execution Processing Unit (EPU) 101a, Operational Processing Unit (OPU) 91a, and User Processing Unit (UPU) 111a) of the security device 3a.

Figure 3:
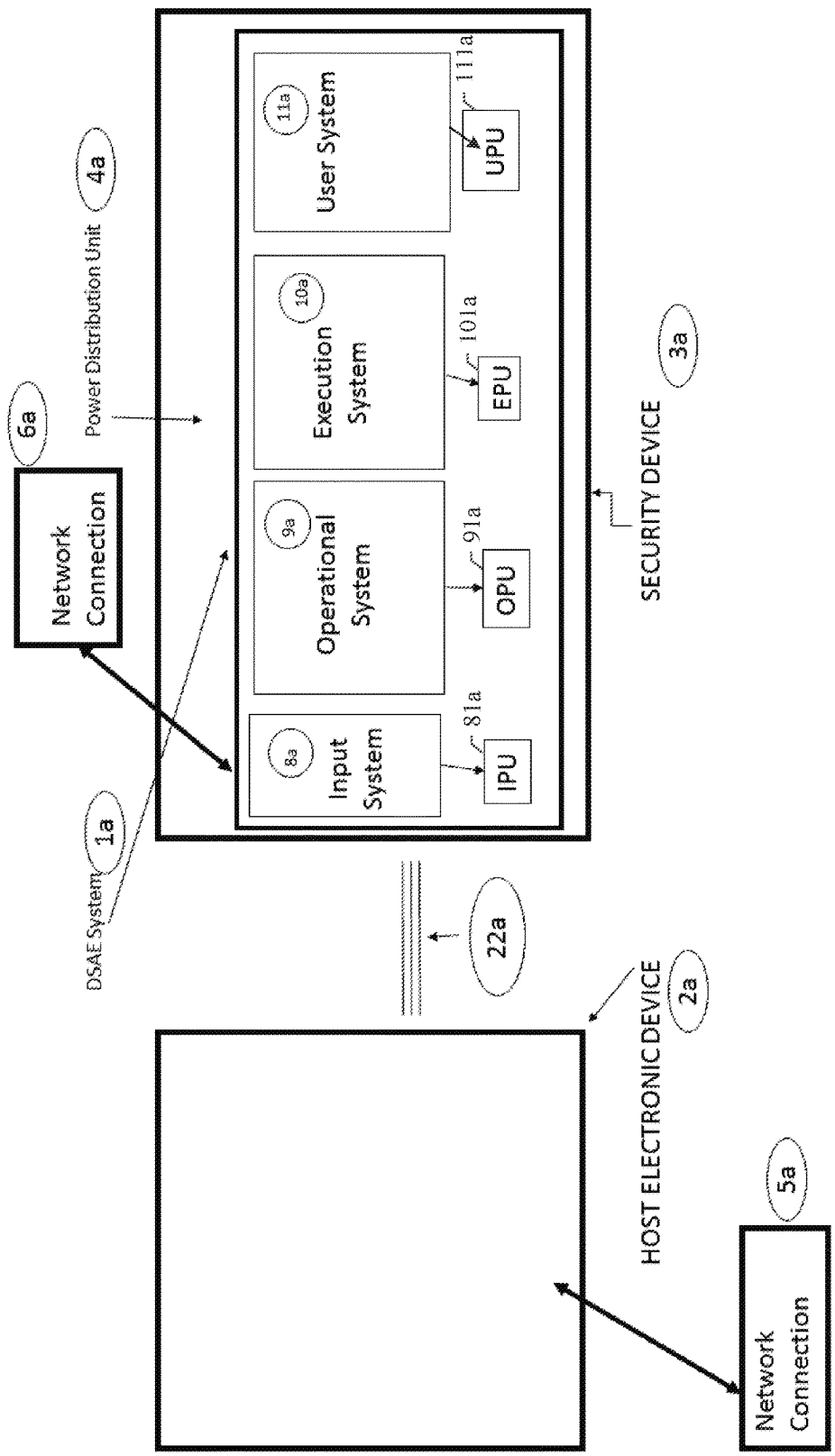
FIG. 3 illustrates an example embodiment comprising a host endpoint device connected to a security device via at least one wired or wireless medium or interface, wherein the security device can include and use a Dynamic Security Architecture Environment (DSAE) security architecture to provide security for the host endpoint device, the security device being configured to enable the host device to connect with an external network via a network connection or interface on the host device or on the security device.

FIG. 3 illustrates an example embodiment of a system comprising a host endpoint device 2a (such as a computer, laptop, tablet, phone, car, medical device, Industrial Control System (ICS) or other electronic or Internet connected device), connected to a security device 3a via at least one wired or wireless medium or interface 22a that the host device 2a can use to communicate with the security device 3a. Similar to the embodiment shown in FIG. 1, the example embodiment illustrated in FIG. 3 includes the security device 3a that can include and use a DSAE security architecture implemented as DSAE system 1a described above. In the example embodiment of FIG. 3, the DSAE security architecture includes logical software systems, Operational System 9a, Execution System 10a, Input System 8a, and User System 11a and their corresponding physical hardware modules, Input Processing Unit (IPU) 81a, Execution Processing Unit (EPU) 101a, Operational Processing Unit (OPU) 91a, and User Processing Unit (UPU) 111a, each of which reside inside the security device 3a. The host endpoint device 2a can pass data to the security device 3a via interface 22a for security processing via the system components on the security device 3a as described above. Software on the host device 2a allows the host device 2a to communicate with the security device 3a. In the example embodiment, an I/O subsystem on the host device 2a can be used to connect the host device 2a to an external network via a network connection or interface 5a. Alternatively or in addition, the I/O subsystem on the host device 2a can be used to connect the host device 2a to the external network via a network connection or interface 6*a* on the security device 3*a*, which can be accessed via the Input System 8*a*. The security device 3*a* can receive power from an external power source, such as a power distribution unit 4*a*, which powers the DSAE hardware processing modules (Input Processing Unit (IPU) 81*a*, Execution Processing Unit (EPU) 101*a*, Operational Processing Unit (OPU) 91*a*, and User Processing Unit (UPU) 111*a*) of the security device 3*a*. Alternatively, the security device 3*a* can receive power from the host endpoint device 2*a* via interface 22*a*.

Figure 4:
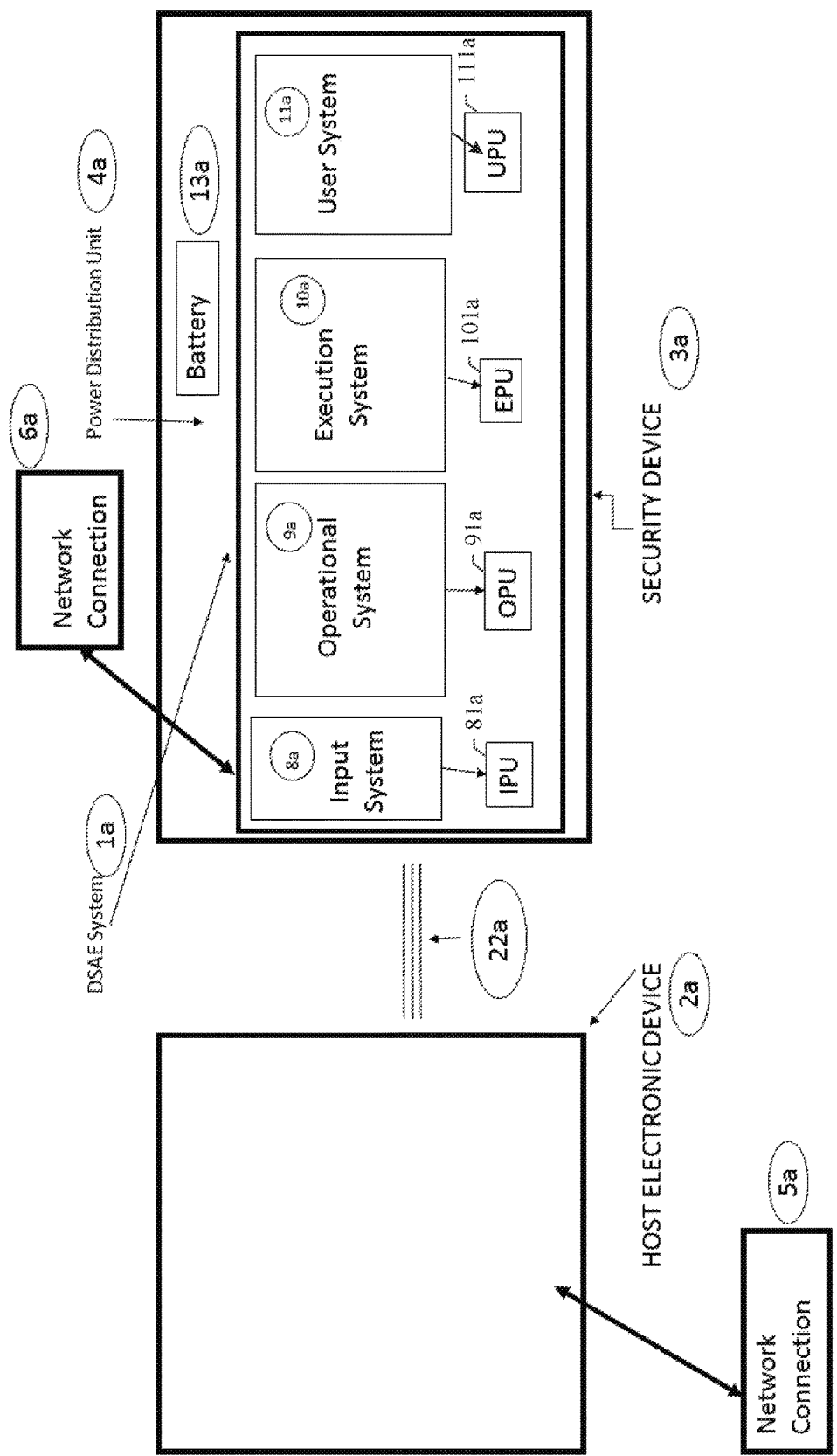
FIG. 4 illustrates an example embodiment comprising a host endpoint device connected to a security device via at least one wired or wireless medium or interface, wherein the security device can include and use a Dynamic Security Architecture Environment (DSAE) security architecture to provide security for the host endpoint device, the security device being configured to enable the host device to connect with an external network via a network connection or interface on the host device or on the security device, the security device also being configured to receive power from an external power distribution unit or a battery inside the security device, which powers the DSAE hardware processing modules (Input Processing Unit, Execution Processing Unit (EPU), Operational Processing Unit (OPU) or User Processing Unit (UPU) of the security device.

FIG. 4 illustrates an example embodiment of a system comprising a host endpoint device 2*a* (such as a computer, laptop, tablet, phone, car, medical device, Industrial Control System (ICS) or other electronic or Internet connected device), connected to a security device 3*a* via at least one wired or wireless medium or interface 22*a* that the host device 2*a* can use to communicate with the security device 3*a*. Similar to the embodiment shown in FIG. 1, the example embodiment illustrated in FIG. 4 includes the security device 3*a* that can include and use a DSAE security architecture implemented as DSAE system 1*a* described above. In the example embodiment of FIG. 3, the DSAE security architecture includes logical software systems, Operational System 9*a*, Execution System 10*a*, Input System 8*a*, and User System 11*a* and their corresponding physical hardware modules, Input Processing Unit (IPU) 81*a*, Execution Processing Unit (EPU) 101*a*, Operational Processing Unit (OPU) 91*a*, and User Processing Unit (UPU) 111*a*, each of which reside inside the security device 3*a*. The host endpoint device 2*a* can pass data to the security device 3*a* via interface 22*a* for security processing via the system components on the security device 3*a* as described above. Software on the host device 2*a* allows the host device 2*a* to communicate with the security device 3*a*. In the example embodiment, an I/O subsystem on the host device 2*a* can be used to connect the host device 2*a* to an external network via a network connection or interface 5*a*. Alternatively or in addition, the I/O subsystem on the host device 2*a* can be used to connect the host device 2*a* to the external network via a network connection or interface 6*a* on the security device 3*a*, which can be accessed via the Input System 8*a*. The security device 3*a* can receive power from an external power source, such as a power distribution unit 4*a*, which powers the DSAE hardware processing modules (Input Processing Unit (IPU) 81*a*, Execution Processing Unit (EPU) 101*a*, Operational Processing Unit (OPU) 91*a*, and User Processing Unit (UPU) 111*a*) of the security device 3*a*. Alternatively, the security device 3*a* can receive power from the host endpoint device 2*a* via interface 22*a*. In the example embodiment of FIG. 4, the security device 3*a* can also receive power from an external power distribution unit 4*a* or a battery 13*a* inside the security device 3*a*, which powers the DSAE hardware processing modules (Input Processing Unit (IPU) 81*a*, Execution Processing Unit (EPU) 101*a*, Operational Processing Unit (OPU) 91*a*, and User Processing Unit (UPU) 111*a*) of the security device 3*a*.

Figure 5:
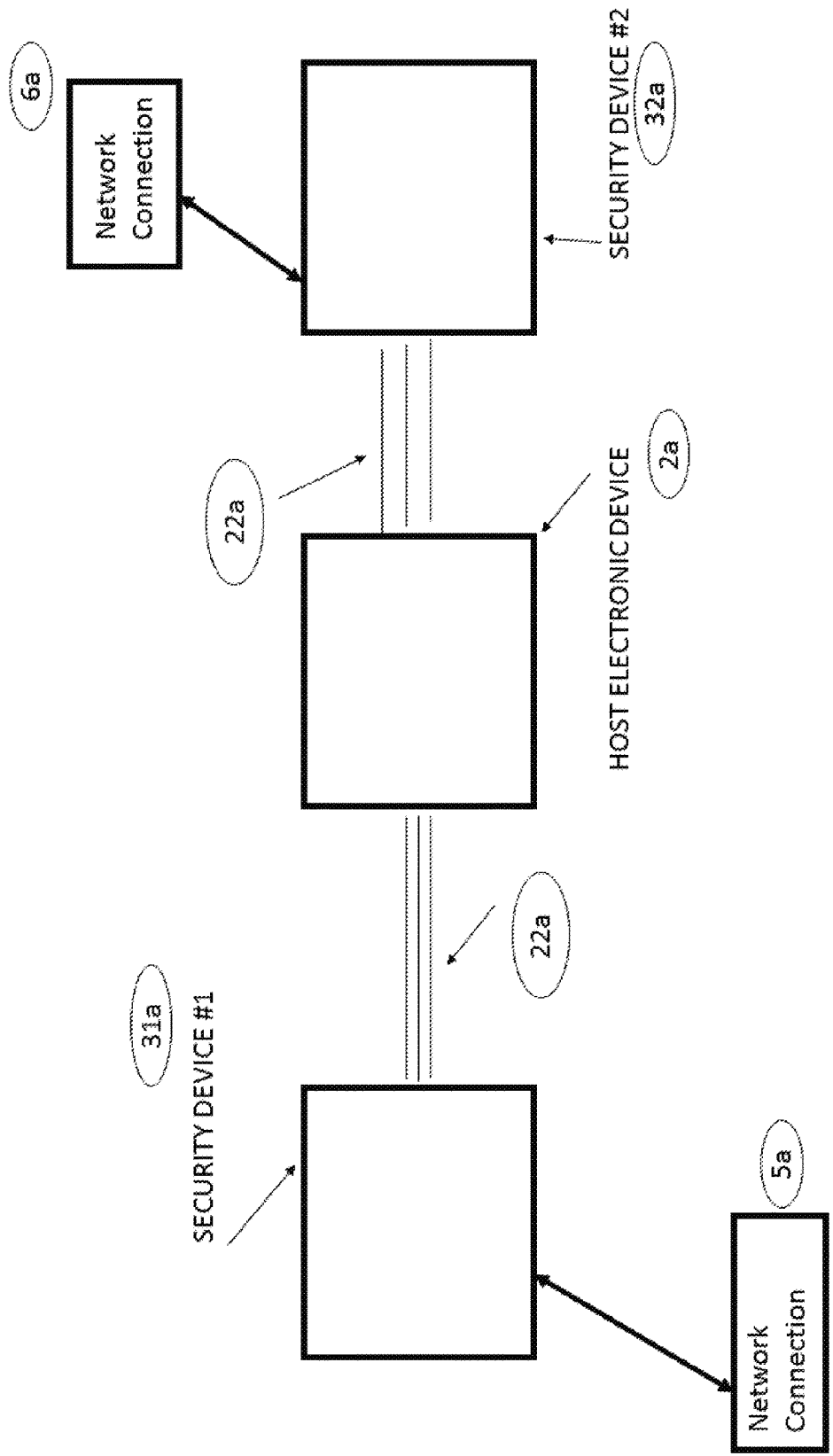
FIG. 5 illustrates an example embodiment of a system comprising a host endpoint device connected to a plurality of security devices, such as security device #1 31a and security device #2 32a, via at least one wired or wireless medium or interface 22a that the host device 2a can use to communicate with the plurality of security devices, wherein each of the security devices can include and use a Dynamic Security Architecture Environment (DSAE) security architecture to provide security for the host endpoint device.

FIG. 5 illustrates an example embodiment of a system comprising a host endpoint device 2*a* (such as a computer, laptop, tablet, phone, car, medical device, Industrial Control System (ICS) or other electronic or Internet connected device), connected to a plurality of security devices, such as security device #1 31*a* and security device #2 32*a*, via at least one wired or wireless medium or interface 22*a* that the host device 2*a* can use to communicate with the plurality of security devices 31*a*/32*a*. Similar to the embodiment shown in FIG. 1, the example embodiment illustrated in FIG. 5 includes the plurality of security devices 31*a*/32*a* that each can include and use a DSAE security architecture implemented as DSAE system 1*a* described above. In the example embodiment of FIG. 5, the DSAE security architecture for each of the plurality of security devices 31*a*/32*a* can include logical software systems, Operational System 9*a*, Execution System 10*a*, Input System 8*a*, and User System 11*a* and their corresponding physical hardware modules, Input Processing Unit (IPU) 81*a*, Execution Processing Unit (EPU) 101*a*, Operational Processing Unit (OPU) 91*a*, and User Processing Unit (UPU) 111*a*, each of which reside inside each of the security devices 31*a*/32*a*. The host endpoint device 2*a* can pass data to either of the security devices 31*a*/32*a* via interface 22*a* for security processing via the system components on the security devices 31*a*/32*a* as described above. Software on the host device 2*a* allows the host device 2*a* to communicate with the security devices 31*a*/32*a*. In the example embodiment, an I/O subsystem on the host device 2*a* can be used to connect the host device 2*a* to an external network via a network connection or interface 5*a* on the security device 31*a*, which can be accessed via the Input System 8*a* on the security device 31*a*. Alternatively or in addition, the I/O subsystem on the host device 2*a* can be used to connect the host device 2*a* to the external network via a network connection or interface 6*a* on the security device 32*a*, which can be accessed via the Input System 8*a* on the security device 32*a*. In this manner, the host device 2*a* can establish a connection to the external network using any of a plurality of connected security devices.

Figure 6:
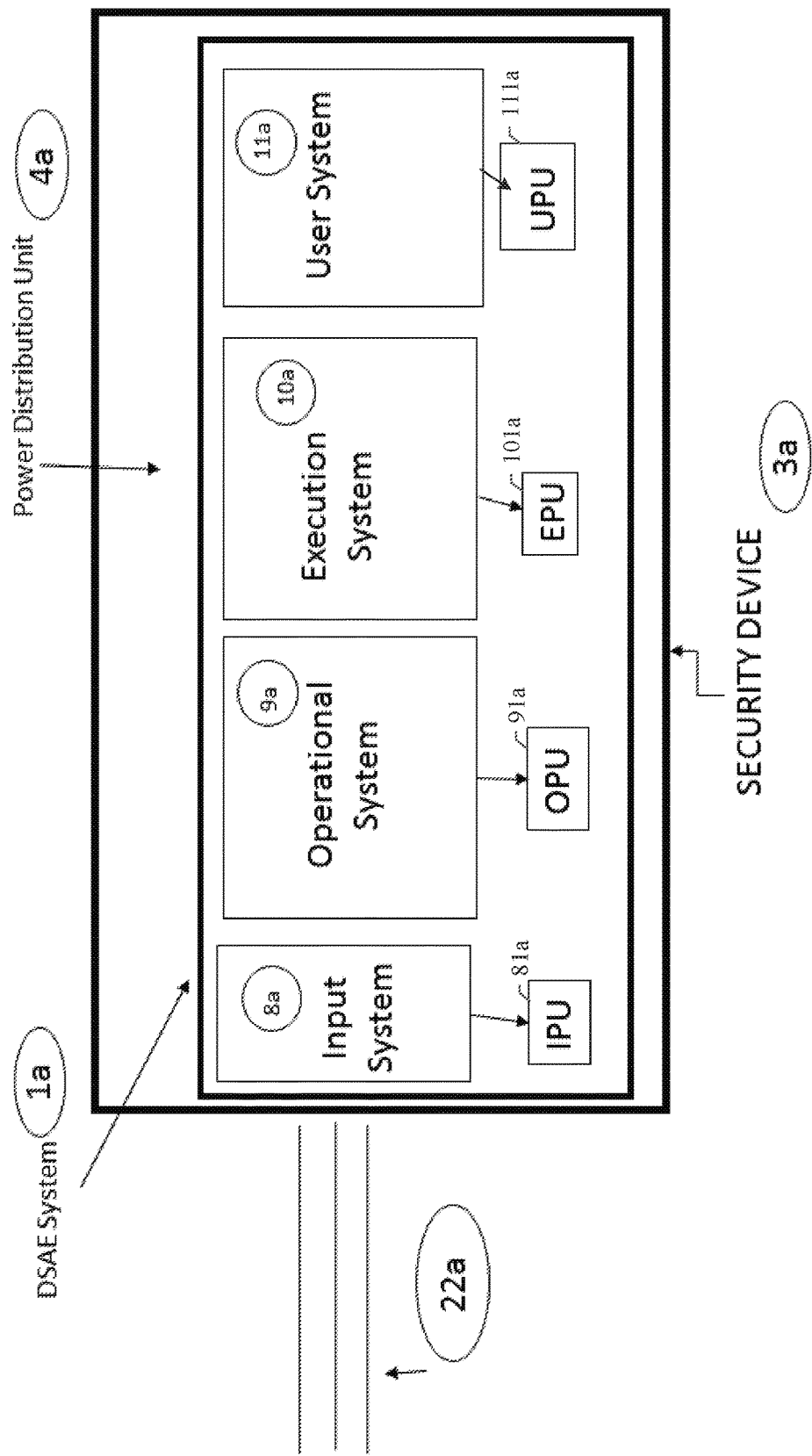
FIG. 6 illustrates a detail of the components inside the security device using the DSAE security architecture in an example embodiment.

FIG. 6 illustrates a detail of the components inside the security device 3*a* using the DSAE security architecture in an example embodiment. Similar to the embodiment shown in FIG. 1, the example embodiment illustrated in FIG. 6 includes and uses a DSAE security architecture implemented as DSAE system 1*a* described above. In the example embodiment of FIG. 6, the DSAE security architecture includes logical software systems, Operational System 9*a*, Execution System 10*a*, Input System 8*a*, and User System 11*a* and their corresponding physical hardware modules, Input Processing Unit (IPU) 81*a*, Execution Processing Unit (EPU) 101*a*, Operational Processing Unit (OPU) 91*a*, and User Processing Unit (UPU) 111*a*, each of which reside inside the security device 3*a*. The host endpoint device 2*a* can pass data to the security device 3*a* via interface 22*a* for security processing via the system components on the security device 3*a* as described above. The security device 3*a* can receive power from an external power source, such as a power distribution unit 4*a*, which powers the DSAE hardware processing modules (Input Processing Unit (IPU) 81*a*, Execution Processing Unit (EPU) 101*a*, Operational Processing Unit (OPU) 91*a*, and User Processing Unit (UPU) 111*a*) of the security device 3*a*. Alternatively, the security device 3*a* can receive power from the host endpoint device 2*a* via interface 22*a*.

Figure 7:
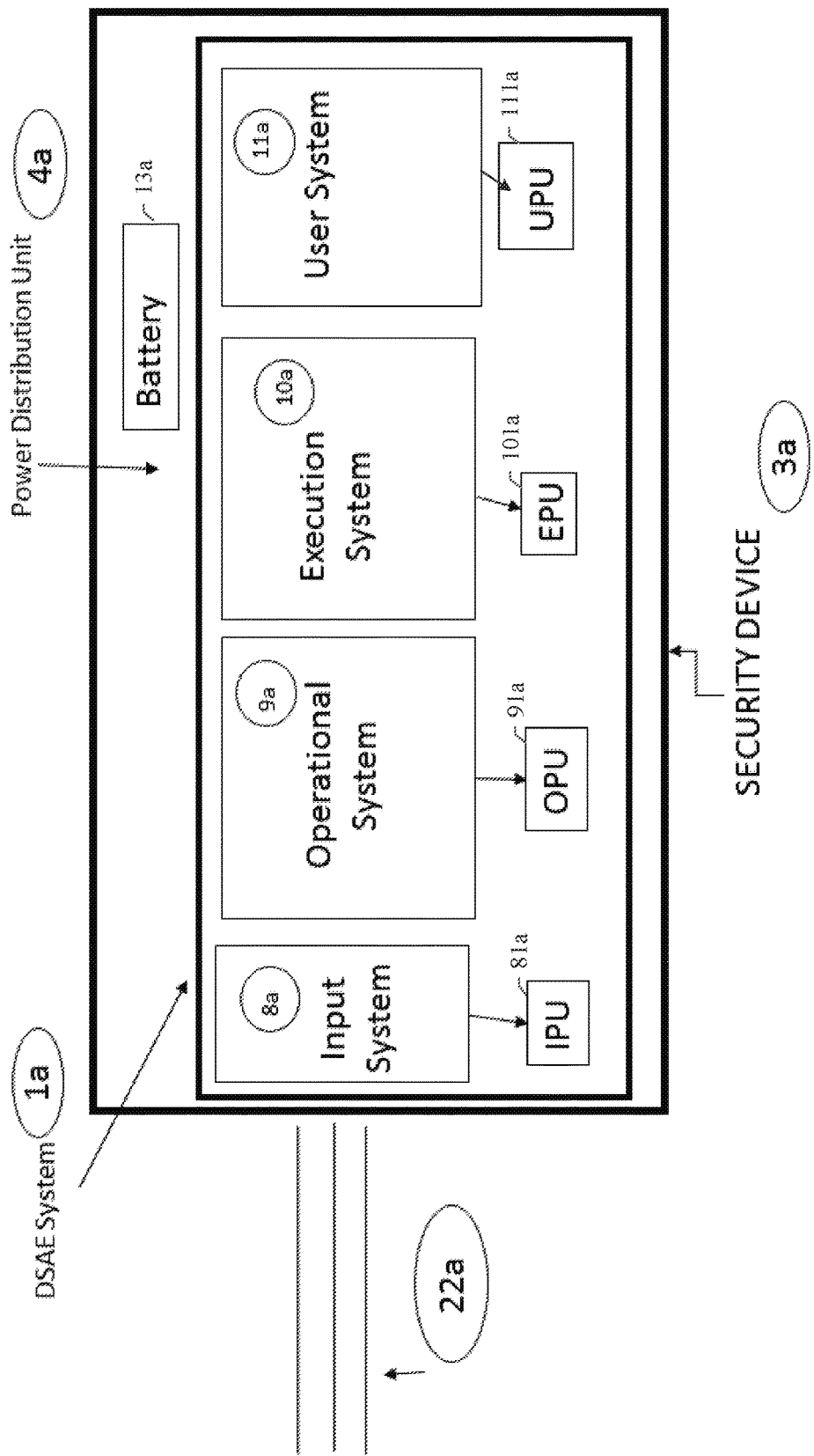
FIG. 7 illustrates a detail of the components inside the security device using the DSAE security architecture in an example embodiment, wherein the security device is configured to receive power from an external power distribution unit or a battery inside the security device, which powers the DSAE hardware processing modules (Input Processing Unit (IPU), Execution Processing Unit (EPU), Operational Processing Unit (OPU) or User Processing Unit (UPU) of the security device.

FIG. 7 illustrates a detail of the components inside the security device 3*a* using the DSAE security architecture in an example embodiment. Similar to the embodiment shown in FIG. 1, the example embodiment illustrated in FIG. 7 includes and uses a DSAE security architecture implemented as DSAE system 1*a* described above. In the example embodiment of FIG. 7, the DSAE security architecture includes logical software systems, Operational System 9*a*, Execution System 10*a*, Input System 8*a*, and User System 11*a* and their corresponding physical hardware modules, Input Processing Unit (IPU) 81*a*, Execution Processing Unit (EPU) 101*a*, Operational Processing Unit (OPU) 91*a*, and User Processing Unit (UPU) 111*a*, each of which reside inside the security device 3*a*. The host endpoint device 2*a* can pass data to the security device 3a via interface 22a for security processing via the system components on the security device 3a as described above. The security device 3a can receive power from an external power source, such as a power distribution unit 4a, which powers the DSAE hardware processing modules (Input Processing Unit (IPU) 81a, Execution Processing Unit (EPU) 101a, Operational Processing Unit (OPU) 91a, and User Processing Unit (UPU) 111a) of the security device 3a. Alternatively, the security device 3a can receive power from the host endpoint device 2a via interface 22a. In the example embodiment of FIG. 7, the security device 3a can also receive power from an external power distribution unit 4a or battery 13a inside the security device 3a, which powers the DSAE hardware processing modules (Input Processing Unit (IPU) 81a, Execution Processing Unit (EPU) 101a, Operational Processing Unit (OPU) 91a, and User Processing Unit (UPU) 111a) of the security device 3a.

Figure 8:
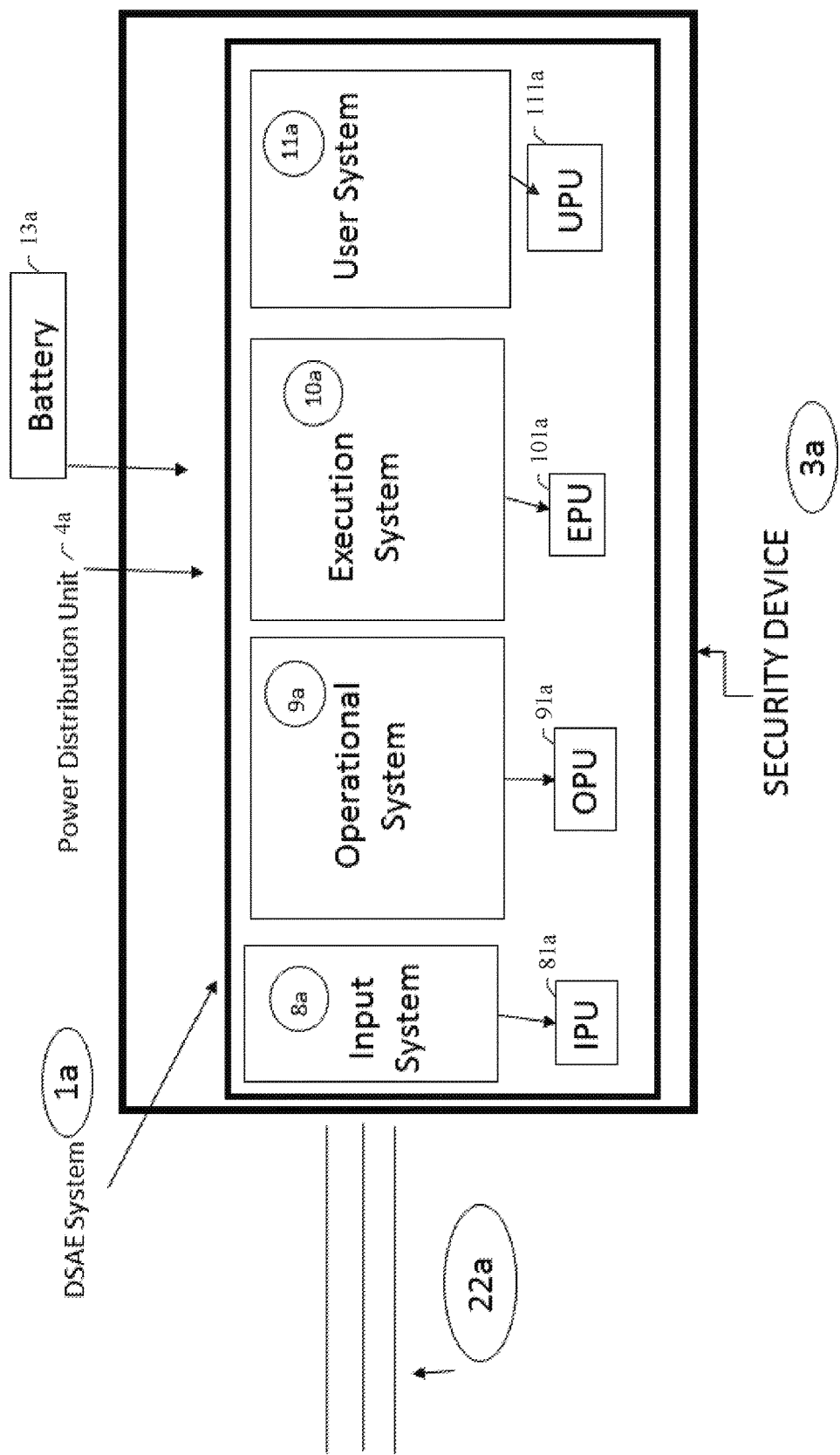
FIG. 8 illustrates a detail of the components inside the security device using the DSAE security architecture in an example embodiment, wherein the security device is configured to receive power from an external power distribution unit or a battery external to the security device, which powers the DSAE hardware processing modules (Input Processing Unit (IPU), Execution Processing Unit (EPU), Operational Processing Unit (OPU) or User Processing Unit (UPU) of the security device.

FIG. 8 illustrates a detail of the components inside the security device 3a using the DSAE security architecture in an example embodiment. Similar to the embodiment shown in FIG. 1, the example embodiment illustrated in FIG. 8 includes and uses a DSAE security architecture implemented as DSAE system 1a described above. In the example embodiment of FIG. 8, the DSAE security architecture includes logical software systems, Operational System 9a, Execution System 10a, Input System 8a, and User System 11a and their corresponding physical hardware modules, Input Processing Unit (IPU) 81a, Execution Processing Unit (EPU) 101a, Operational Processing Unit (OPU) 91a, and User Processing Unit (UPU) 111a, each of which reside inside the security device 3a. In the example embodiment of FIG. 8, the security device 3a can receive power from an external power distribution unit 4a or battery 13a external to the security device 3a, which powers the DSAE hardware processing modules (Input Processing Unit (IPU) 81a, Execution Processing Unit (EPU) 101a, Operational Processing Unit (OPU) 91a, and User Processing Unit (UPU) 111a) of the security device 3a.

Figure 9:
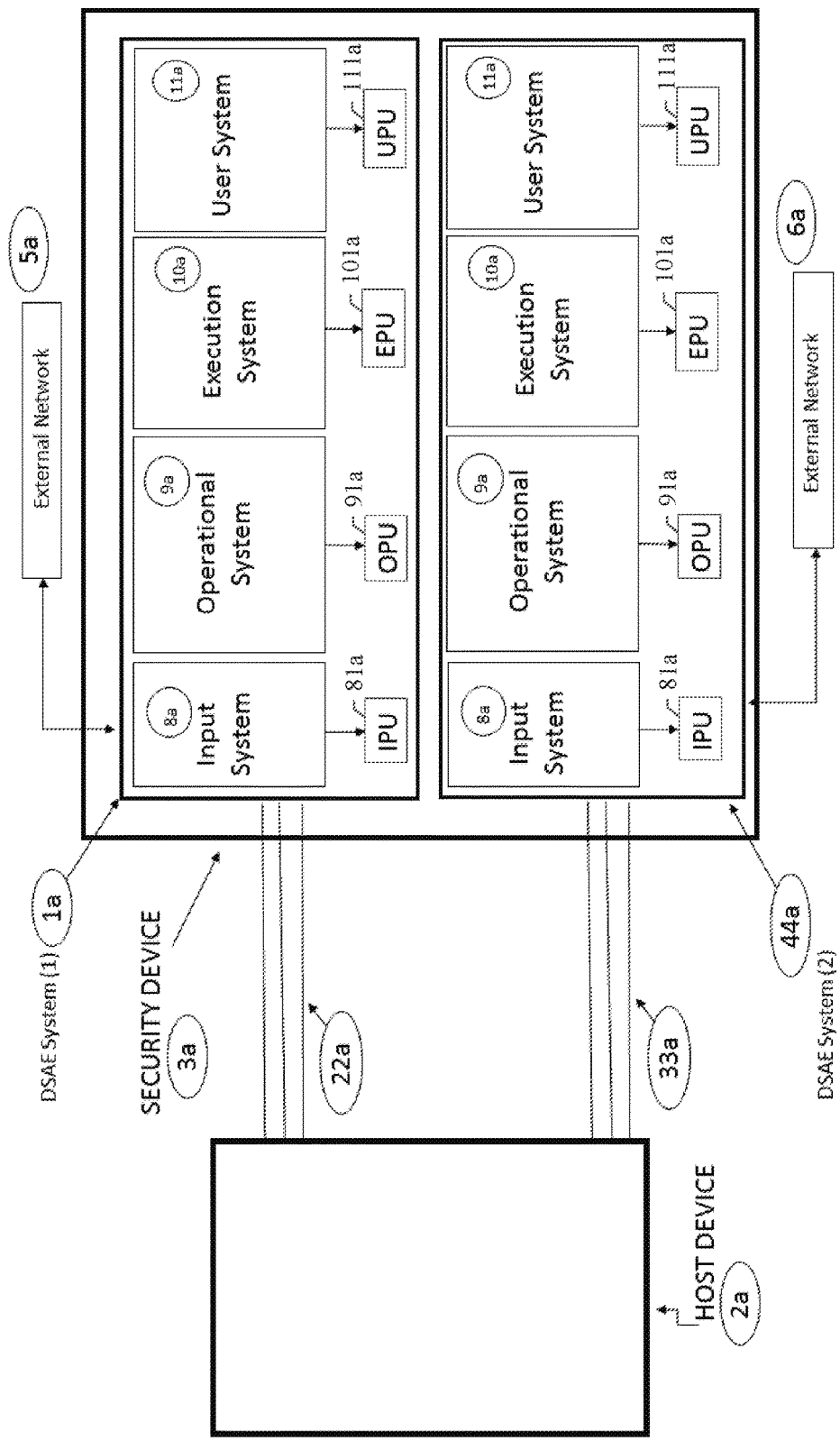
FIG. 9 illustrates an example embodiment of a system comprising a host endpoint device connected to a security device having a plurality of DSAE systems residing within a single physical casing or housing of the security device.

FIG. 9 illustrates an example embodiment of a system comprising a host endpoint device 2a (such as a computer, laptop, tablet, phone, car, medical device, Industrial Control System (ICS) or other electronic or Internet connected device), connected to a security device 3a having a plurality of DSAE systems, such as DSAE system #1 1a and DSAE system #2 44a, residing within a single physical casing or housing of the security device 3a. The host endpoint device 2a can communicate with either of the DSAE systems 1a/44a of security device 3a via at least one or more wired or wireless media or interfaces 22a/33a. The example embodiment illustrated in FIG. 9 includes the plurality of DSAE systems 1a/44a that each can include and use a DSAE security architecture implemented as described above. In the example embodiment of FIG. 9, the DSAE security architecture for each of the plurality of DSAE systems 1a/44a can include logical software systems, Operational System 9a, Execution System 10a, Input System 8a, and User System 11a and their corresponding physical hardware modules, Input Processing Unit (IPU) 81a, Execution Processing Unit (EPU) 101a, Operational Processing Unit (OPU) 91a, and User Processing Unit (UPU) 111a, each of which reside inside each of the DSAE systems 1a/44a, all of which resides within the security device 3a. The host endpoint device 2a can pass data to either of the DSAE systems 1a/44a via interfaces 22a/33a for security processing via the system components on the security device 3a as described above. Software on the host device 2a allows the host device 2a to communicate with either of the DSAE systems 1a/44a. In the example embodiment, an I/O subsystem on the host device 2a can be used to connect the host device 2a to an external network via a network connection or interface 5a on the security device 3a, which can be accessed via the Input System 8a of the DSAE system 1a within security device 3a. The host endpoint device 2a can use interface 22a to communicate with the DSAE system 1a and the interface 5a. Alternatively or in addition, the I/O subsystem on the host device 2a can be used to connect the host device 2a to the external network via a network connection or interface 6a on the security device 3a, which can be accessed via the Input System 8a of the DSAE system 44a within security device 3a. The host endpoint device 2a can use interface 33a to communicate with the DSAE system 44a and the interface 6a. In this manner, the host device 2a can establish a connection to the external network using at least one of the DSAE systems within a connected security device.

Figure 10:
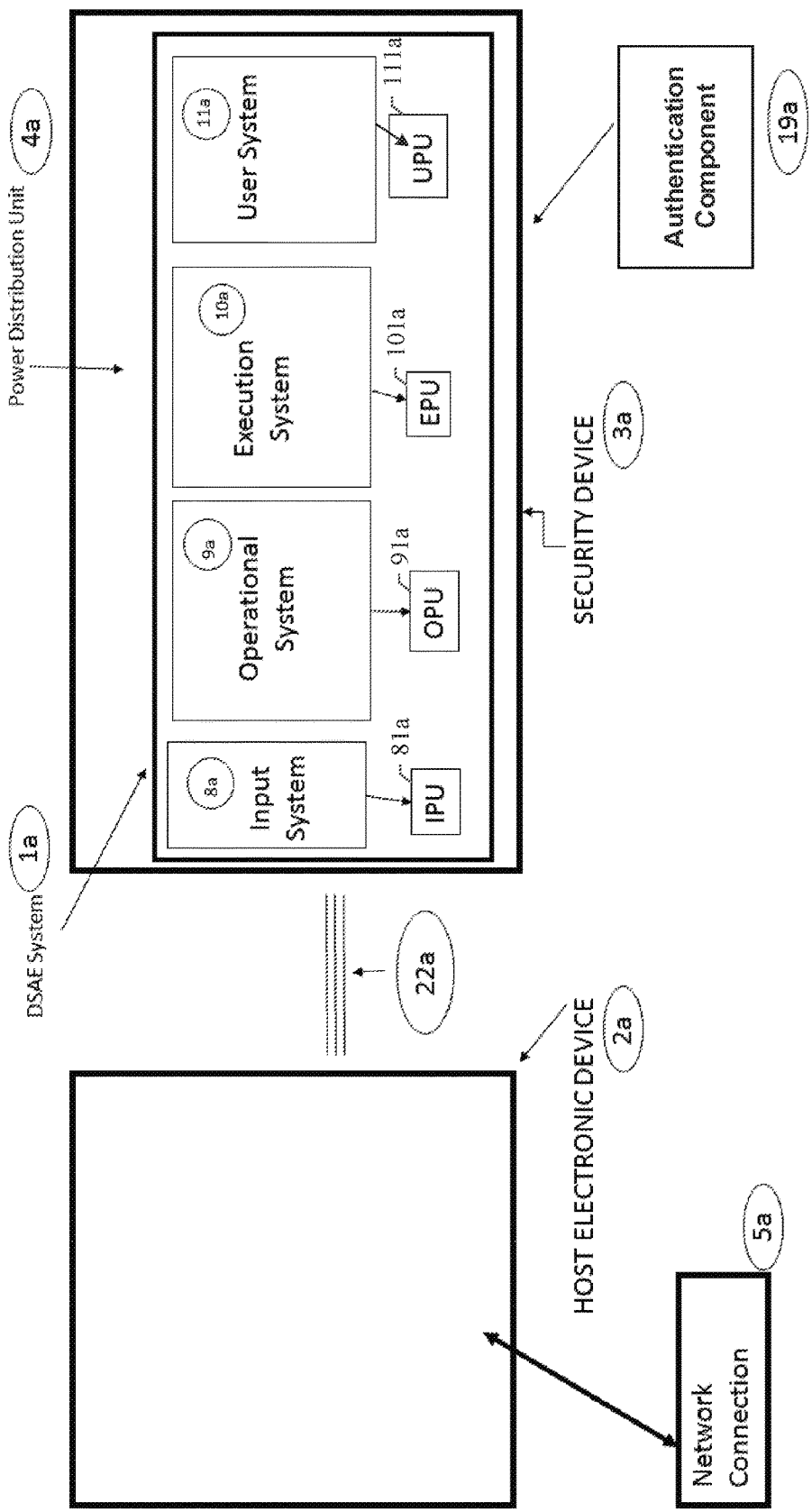
FIGS. 10 through 18 illustrate example embodiments of the security device using the DSAE security architecture in an example embodiment, wherein the security device is configured to include at least one authentication hardware component.

FIG. 10 illustrates an example embodiment of a system comprising a host endpoint device 2a (such as a computer, laptop, tablet, phone, car, medical device, Industrial Control System (ICS) or other electronic or Internet connected device), connected to a security device 3a via at least one wired or wireless medium or interface 22a that the host device 2a can use to communicate with the security device 3a. Similar to the embodiment shown in FIG. 1, the example embodiment illustrated in FIG. 10 includes the security device 3a that can include and use a DSAE security architecture implemented as DSAE system 1a described above. In the example embodiment of FIG. 10, the DSAE security architecture includes logical software systems, Operational System 9a, Execution System 10a, Input System 8a, and User System 11a and their corresponding physical hardware modules, Input Processing Unit (IPU) 81a, Execution Processing Unit (EPU) 101a, Operational Processing Unit (OPU) 91a, and User Processing Unit (UPU) 111a, each of which reside inside the security device 3a. The host endpoint device 2a can pass data to the security device 3a via interface 22a for security processing via the system components on the security device 3a as described above. Software on the host device 2a allows the host device 2a to communicate with the security device 3a. In the example embodiment, an I/O subsystem on the host device 2a can be used to connect the host device 2a to an external network via a network connection or interface 5a. The security device 3a can receive power from an external power source, such as a power distribution unit 4a, which powers the DSAE hardware processing modules (Input Processing Unit (IPU) 81a, Execution Processing Unit (EPU) 101a, Operational Processing Unit (OPU) 91a, and User Processing Unit (UPU) 111a) of the security device 3a. Alternatively, the security device 3a can receive power from the host endpoint device 2a via interface 22a. In the example embodiment of FIG. 10, the security device 3a can also include or interface with an authentication hardware component 19a (such as a keyboard, biometric authentication device, touchscreen, etc.) that is used as a multi-factor authentication device and protocol between the security device 3a and the host endpoint device 2a. The authentication hardware component 19a can be built into or integrated with the security device 3a, such that the authentication hardware component 19a is part of the security device 3a. Software inside the security device 3a and the host endpoint device 2a enables the functionality of the authentication hardware component 19a and the authentication or validation provided by the authentication hardware component 19a.

Figure 11:
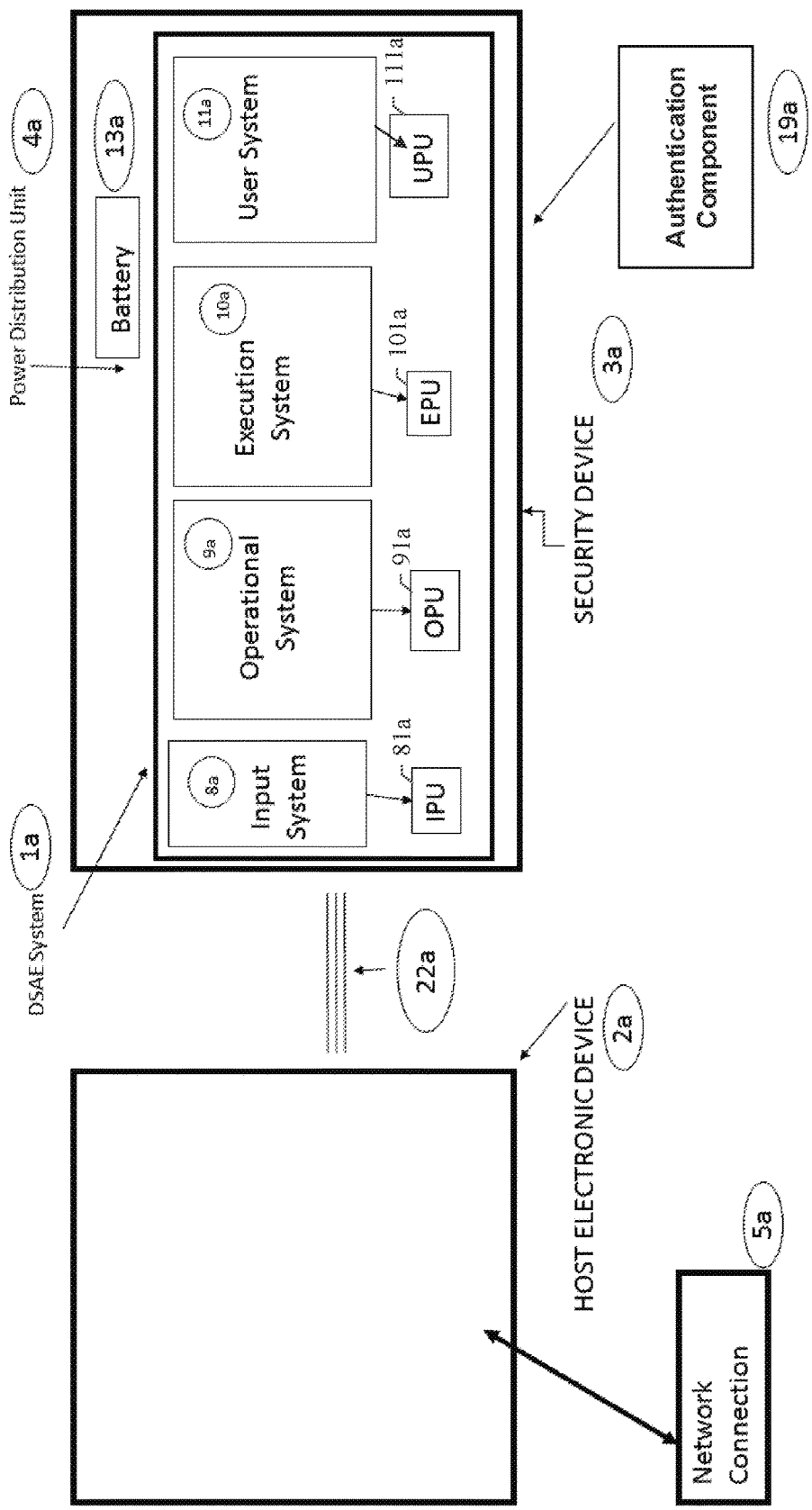

FIG. 11 illustrates an embodiment similar the example embodiment shown in FIG. 2 and described above, except the example embodiment shown in FIG. 11 includes an authentication hardware component 19a included within or interfaced with the security device 3a. In the example embodiment of FIG. 11, the security device 3a can include or interface with the authentication hardware component 19a (such as a keyboard, biometric authentication device, touchscreen, etc.) that is used as a multi-factor authentication device and protocol between the security device 3a and the host endpoint device 2a. The authentication hardware component 19a can be built into or integrated with the security device 3a, such that the authentication hardware component 19a is part of the security device 3a. Software inside the security device 3a and the host endpoint device 2a enables the functionality of the authentication hardware component 19a and the authentication or validation provided by the authentication hardware component 19a.

Figure 12:
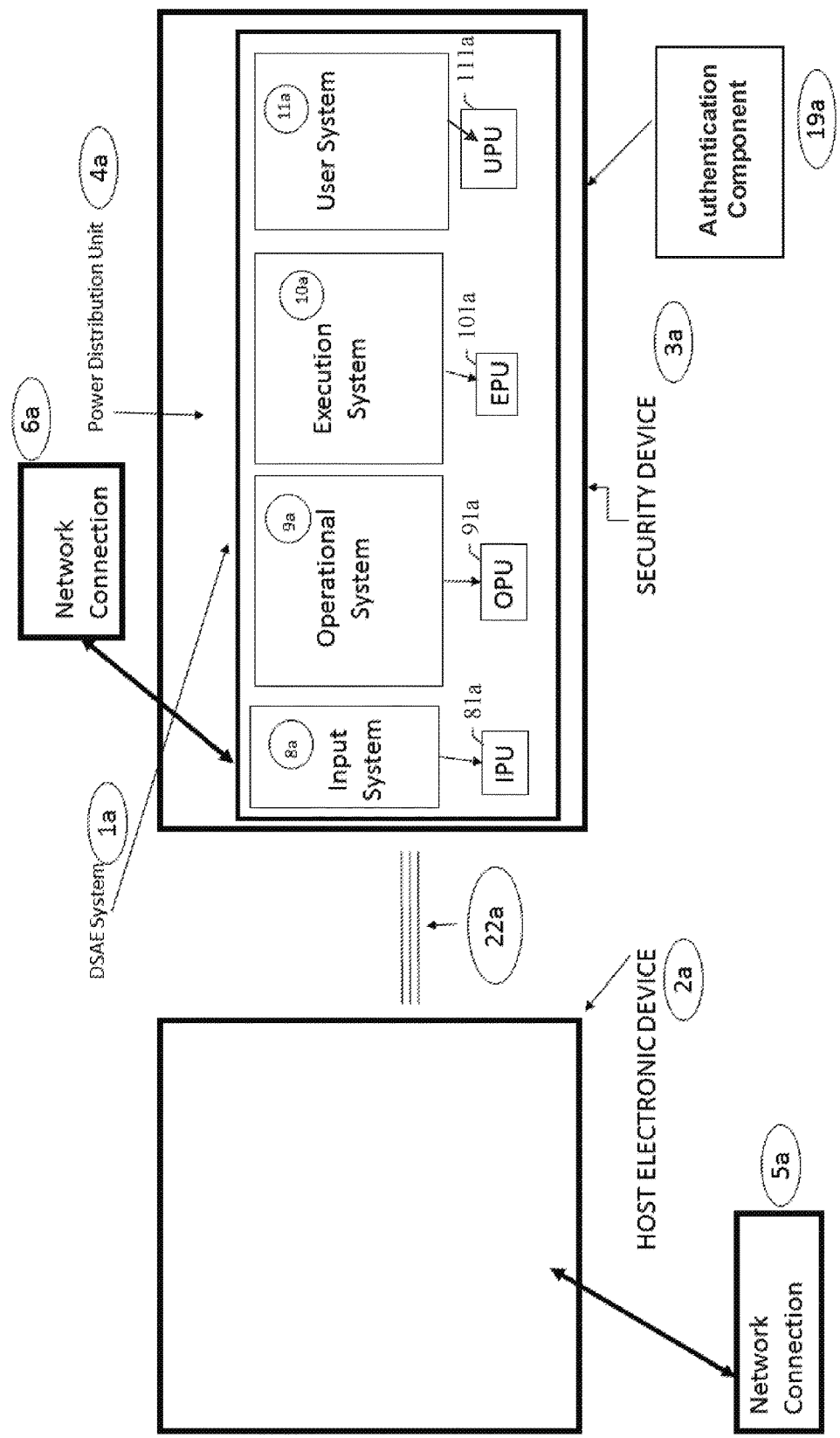

FIG. 12 illustrates an embodiment similar the example embodiment shown in FIG. 3 and described above, except the example embodiment shown in FIG. 12 includes an authentication hardware component 19a included within or interfaced with the security device 3a. In the example embodiment of FIG. 12, the security device 3a can include or interface with the authentication hardware component 19a (such as a keyboard, biometric authentication device, touchscreen, etc.) that is used as a multi-factor authentication device and protocol between the security device 3a and the host endpoint device 2a. The authentication hardware component 19a can be built into or integrated with the security device 3a, such that the authentication hardware component 19a is part of the security device 3a. Software inside the security device 3a and the host endpoint device 2a enables the functionality of the authentication hardware component 19a and the authentication or validation provided by the authentication hardware component 19a.

Figure 13:
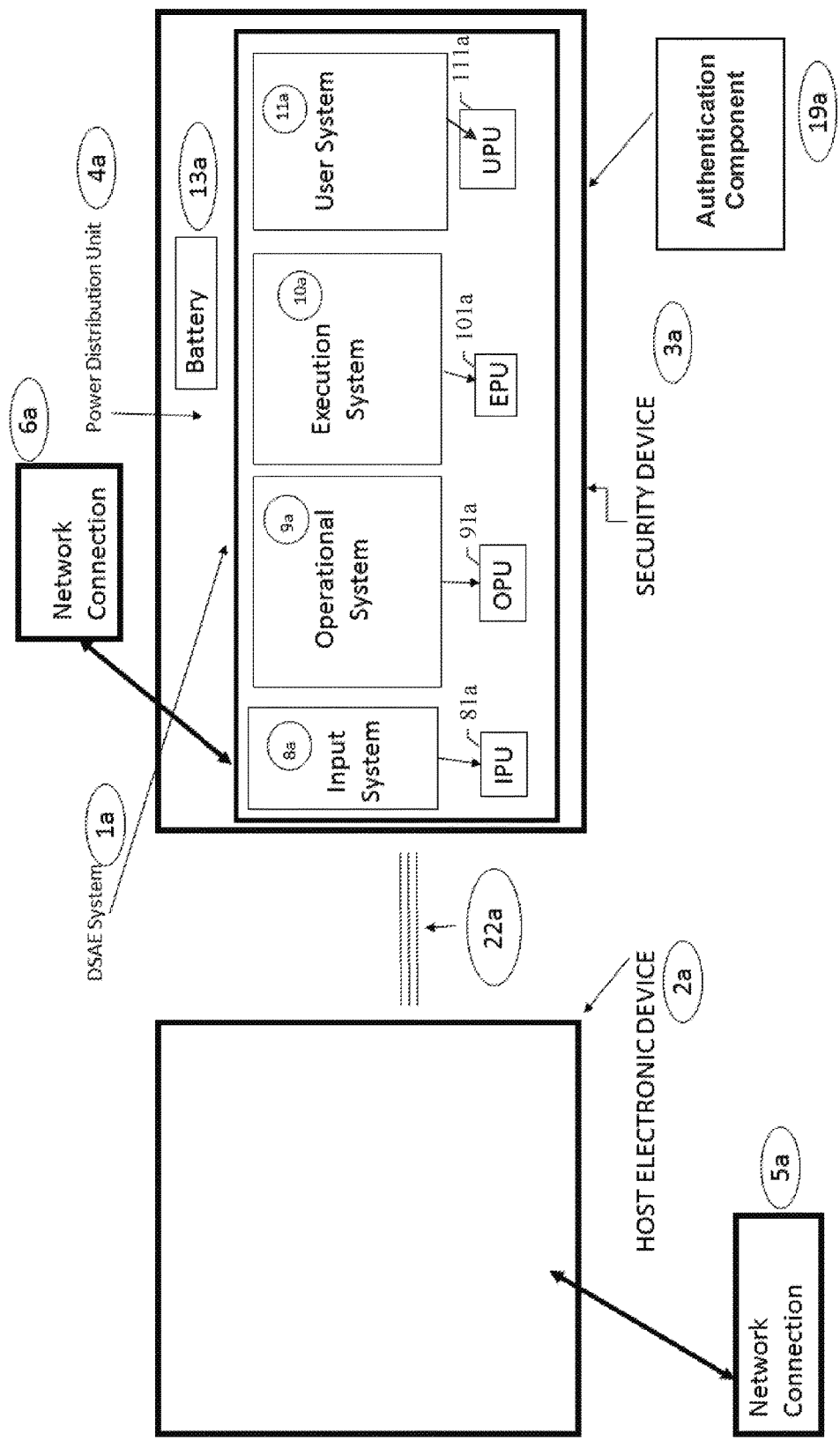

FIG. 13 illustrates an embodiment similar the example embodiment shown in FIG. 4 and described above, except the example embodiment shown in FIG. 13 includes an authentication hardware component 19a included within or interfaced with the security device 3a. In the example embodiment of FIG. 13, the security device 3a can include or interface with the authentication hardware component 19a (such as a keyboard, biometric authentication device, touchscreen, etc.) that is used as a multi-factor authentication device and protocol between the security device 3a and the host endpoint device 2a. The authentication hardware component 19a can be built into or integrated with the security device 3a, such that the authentication hardware component 19a is part of the security device 3a. Software inside the security device 3a and the host endpoint device 2a enables the functionality of the authentication hardware component 19a and the authentication or validation provided by the authentication hardware component 19a.

Figure 14:
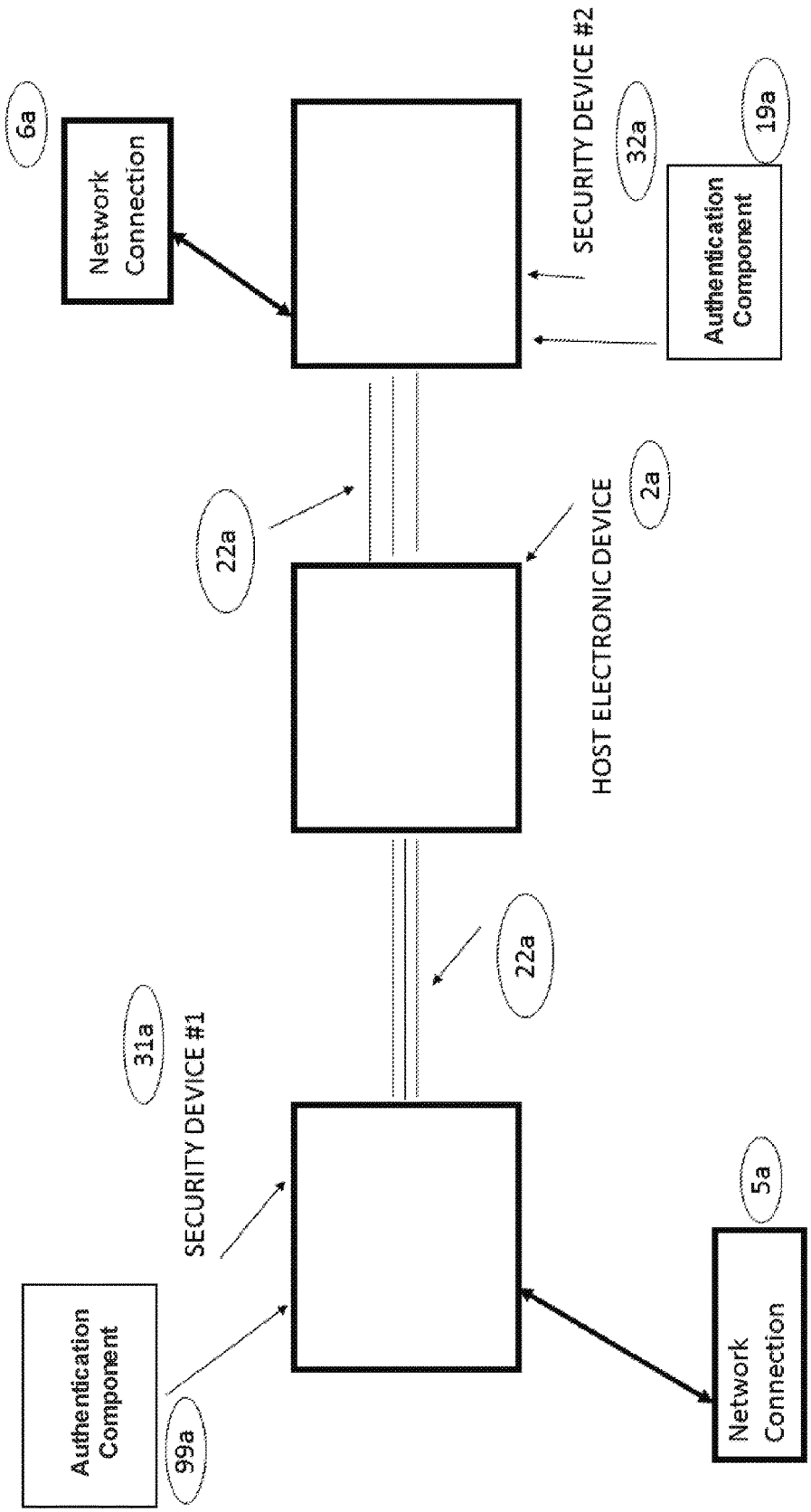

FIG. 14 illustrates an embodiment similar the example embodiment shown in FIG. 5 and described above, except the example embodiment shown in FIG. 14 includes a plurality of authentication hardware modules, a first authentication hardware component 99a included within or interfaced with the security device 31a and a second authentication hardware component 19a included within or interfaced with the security device 32a. In the example embodiment of FIG. 14, each of the security devices 31a/32a can include or interface with one of the authentication hardware modules 99a/19a (such as a keyboard, biometric authentication device, touchscreen, etc.) that are used as a multi-factor authentication device and protocol between the security devices 31a/32a and the host endpoint device 2a. The authentication hardware modules 99a/19a can be built into or integrated with the security devices 31a/32a, such that the authentication hardware modules 99a/19a are part of the respective security devices 31a/32a. Software inside the security devices 31a/32a and the host endpoint device 2a enables the functionality of the authentication hardware modules 99a/19a and the authentication or validation provided by the authentication hardware modules 99a/19a.

Figure 15:
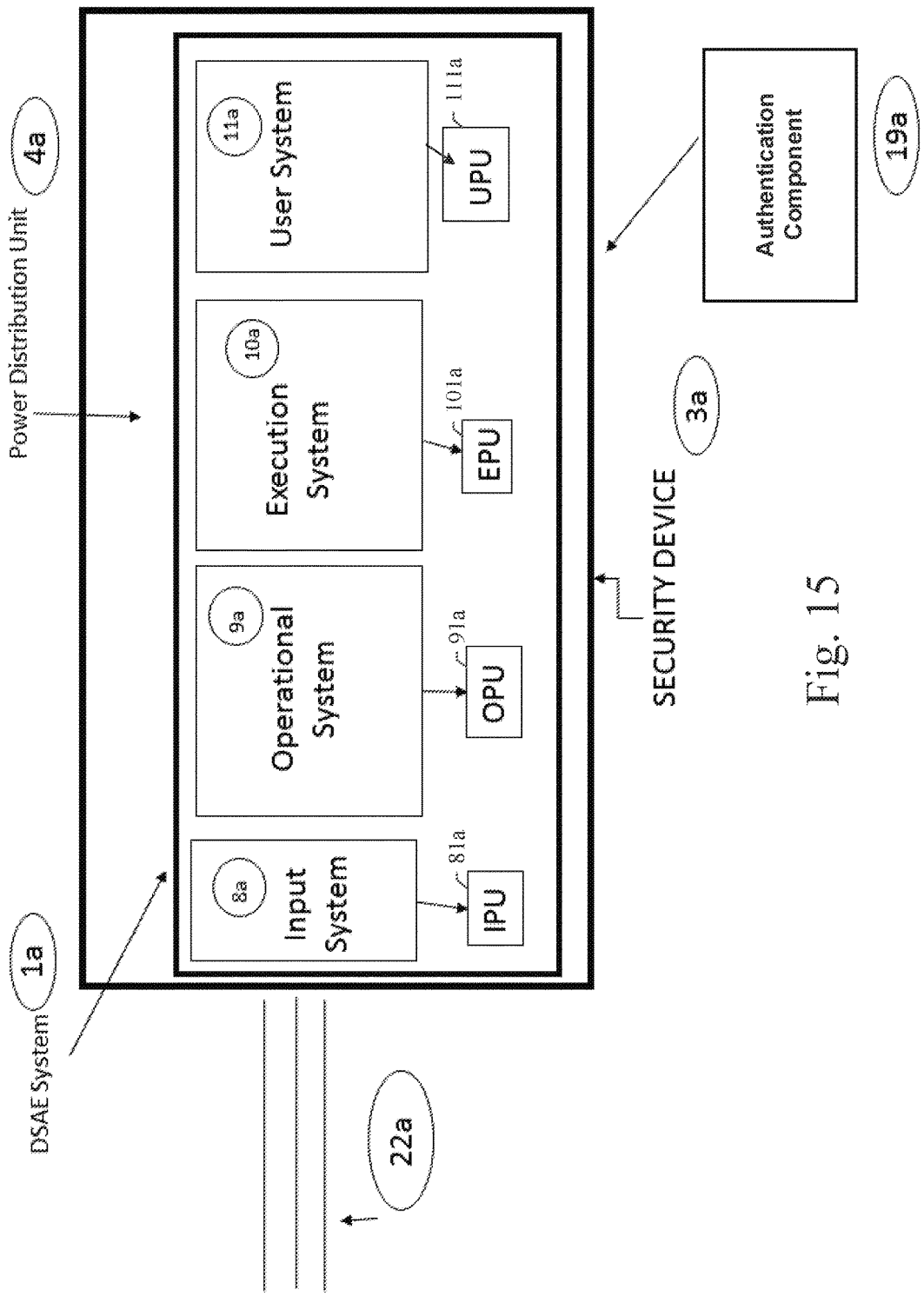

FIG. 15 illustrates an embodiment similar the example embodiment shown in FIG. 6 and described above, except the example embodiment shown in FIG. 15 includes an authentication hardware component 19a included within or interfaced with the security device 3a. In the example embodiment of FIG. 15, the security device 3a can include or interface with the authentication hardware component 19a (such as a keyboard, biometric authentication device, touchscreen, etc.) that is used as a multi-factor authentication device and protocol between the security device 3a and the host endpoint device 2a. The authentication hardware component 19a can be built into or integrated with the security device 3a, such that the authentication hardware component 19a is part of the security device 3a. Software inside the security device 3a and the host endpoint device 2a enables the functionality of the authentication hardware component 19a and the authentication or validation provided by the authentication hardware component 19a.

Figure 16:
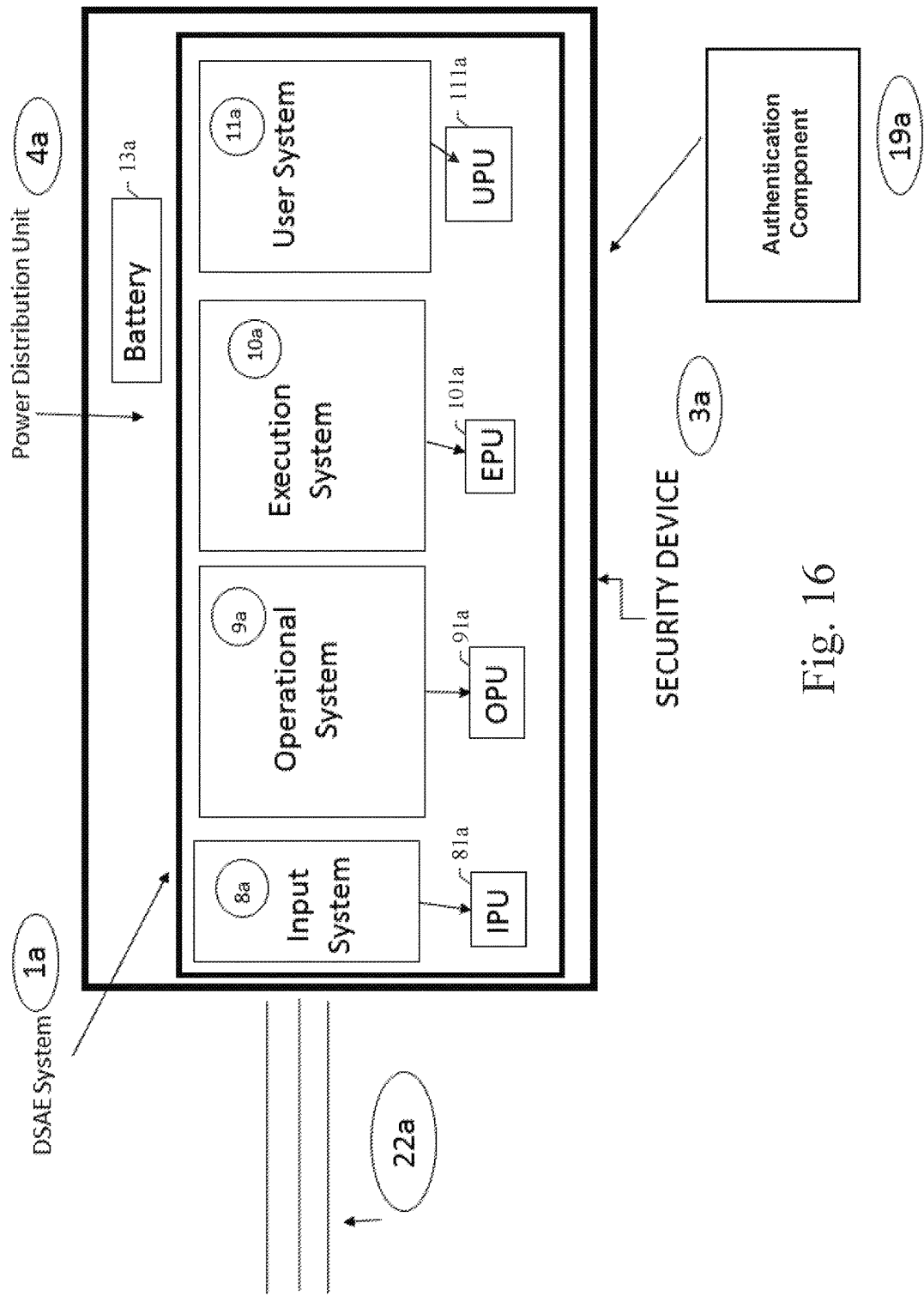

FIG. 16 illustrates an embodiment similar the example embodiment shown in FIG. 7 and described above, except the example embodiment shown in FIG. 16 includes an authentication hardware component 19a included within or interfaced with the security device 3a. In the example embodiment of FIG. 16, the security device 3a can include or interface with the authentication hardware component 19a (such as a keyboard, biometric authentication device, touchscreen, etc.) that is used as a multi-factor authentication device and protocol between the security device 3a and the host endpoint device 2a. The authentication hardware component 19a can be built into or integrated with the security device 3a, such that the authentication hardware component 19a is part of the security device 3a. Software inside the security device 3a and the host endpoint device 2a enables the functionality of the authentication hardware component 19a and the authentication or validation provided by the authentication hardware component 19a.

Figure 17:
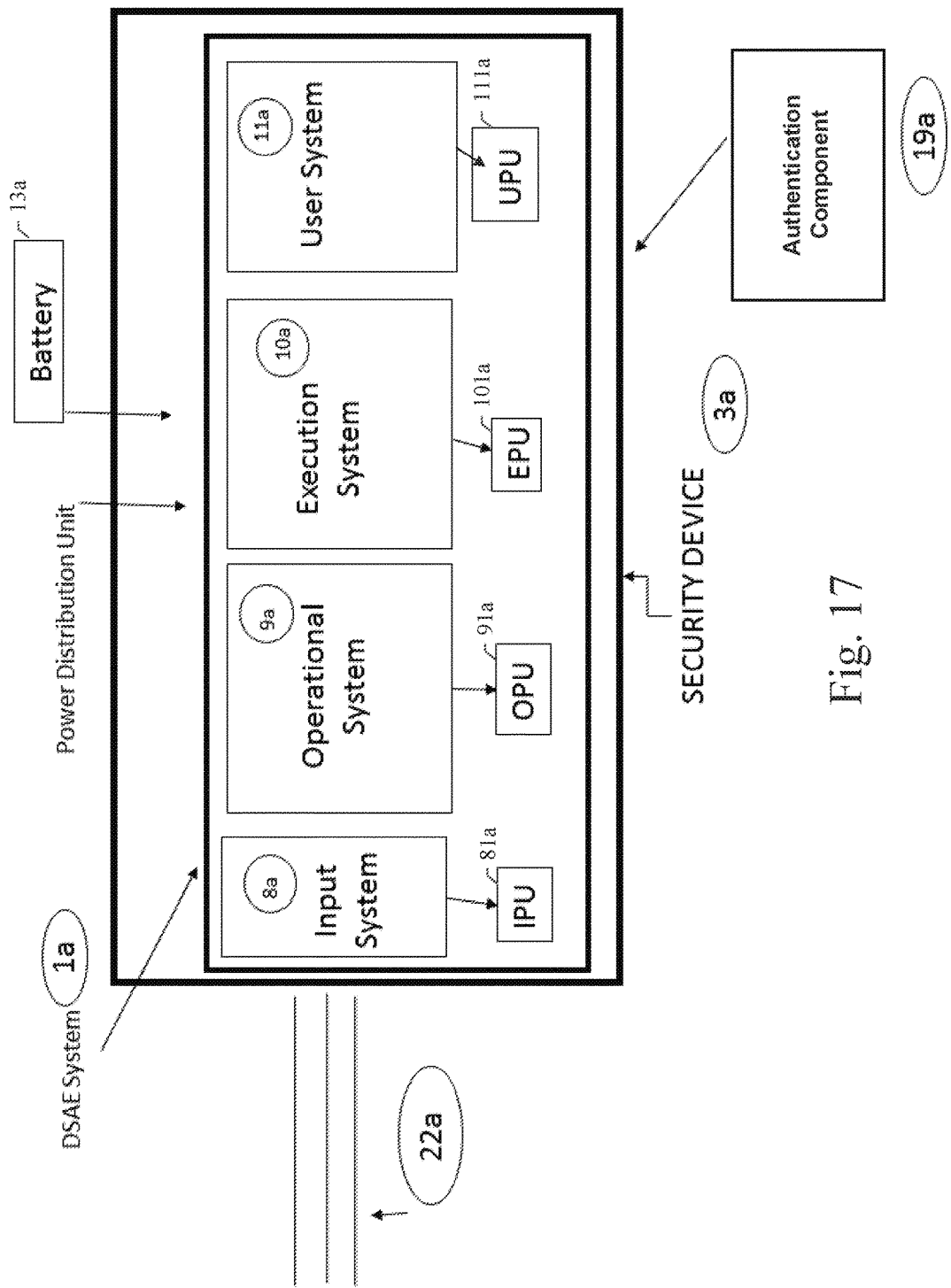

FIG. 17 illustrates an embodiment similar the example embodiment shown in FIG. 8 and described above, except the example embodiment shown in FIG. 17 includes an authentication hardware component 19a included within or interfaced with the security device 3a. In the example embodiment of FIG. 17, the security device 3a can include or interface with the authentication hardware component 19a (such as a keyboard, biometric authentication device, touchscreen, etc.) that is used as a multi-factor authentication device and protocol between the security device 3a and the host endpoint device 2a. The authentication hardware component 19a can be built into or integrated with the security device 3a, such that the authentication hardware component 19a is part of the security device 3a. Software inside the security device 3a and the host endpoint device 2a enables the functionality of the authentication hardware component 19a and the authentication or validation provided by the authentication hardware component 19a.

Figure 18:
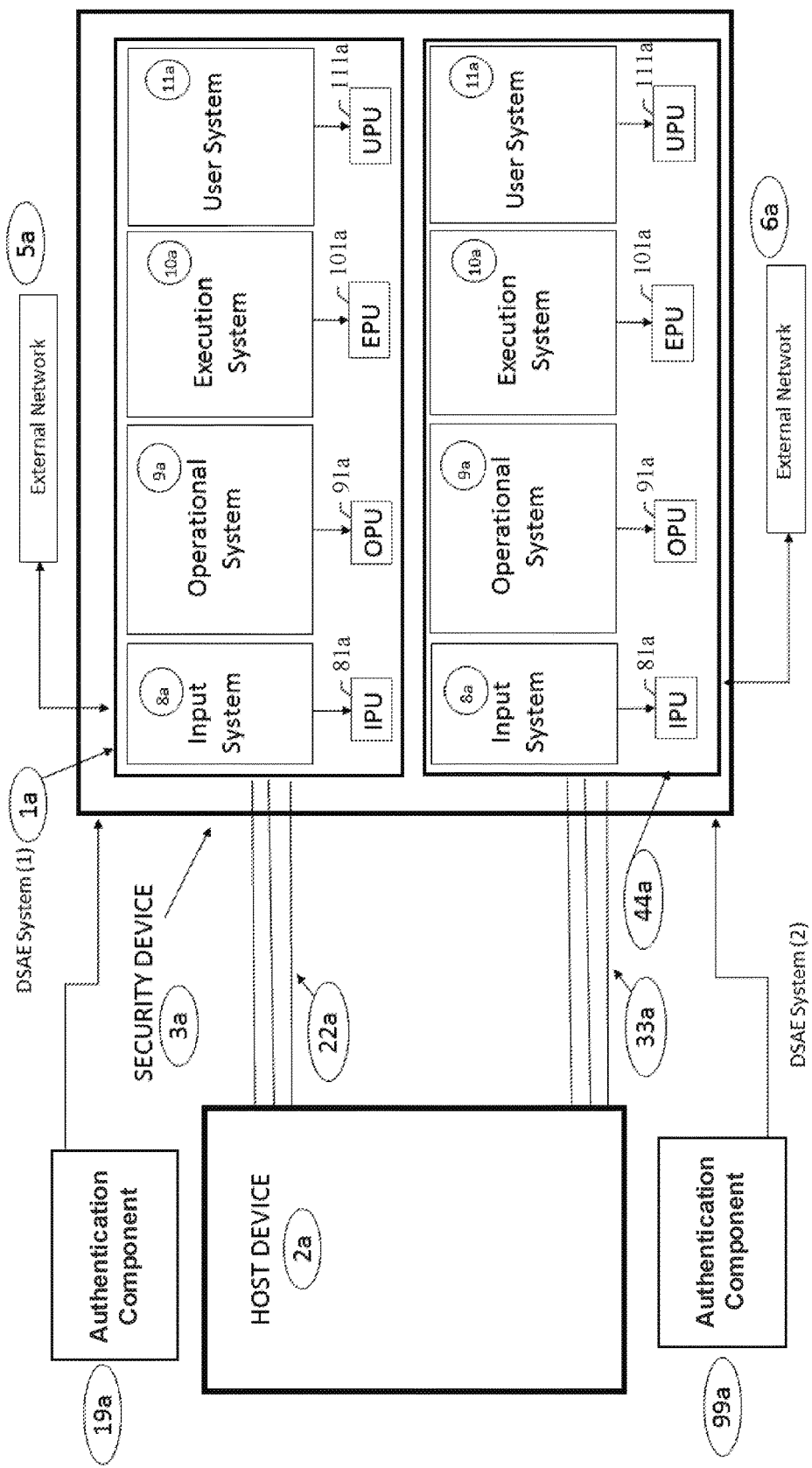

FIG. 18 illustrates an embodiment similar the example embodiment shown in FIG. 9 and described above, except the example embodiment shown in FIG. 18 includes a plurality of authentication hardware modules, a first authentication hardware component 19*a* included within, interfaced with, or associated with the DSAE system 1*a* of security device 3*a*, and a second authentication hardware component 99*a* included within, interfaced with, or associated with the DSAE system 44*a* of security device 3*a*. In the example embodiment of FIG. 18, each of the DSAE systems 1*a*/44*a* of security device 3*a* can include or interface with one of the authentication hardware modules 19*a*/99*a* (such as a keyboard, biometric authentication device, touchscreen, etc.) that are used as a multi-factor authentication device and protocol between the DSAE systems 1*a*/44*a* of security device 3*a* and the host endpoint device 2*a*. The authentication hardware modules 19*a*/99*a* can be built into or integrated with the DSAE systems 1*a*/44*a* of security device 3*a*, such that the authentication hardware modules 19*a*/99*a* are part of the respective DSAE systems 1*a*/44*a* of security device 3*a*. Software inside the DSAE systems 1*a*/44*a* of security device 3*a* and the host endpoint device 2*a* enables the functionality of the authentication hardware modules 19*a*/99*a* and the authentication or validation provided by the authentication hardware modules 19*a*/99*a*.

In all figures, the systems of the DSAE system 1*a* (User 11*a*, Input 8*a*, Operational 9*a*, and Execution 10*a* systems) have the ability to monitor the status of the batteries 13*a* being supplied to each DSAE system. The individual processing modules of each DSAE system have the ability to help monitor the batteries and power being supplied through software. Additionally, software in the Power Distribution Unit 4*a* and batteries 13*a* can determine when the batteries 13*a* are running low of power and also if the Power Distribution Units 4*a* are no longer functioning or receiving power themselves. If multiple Power Distribution Units 4*a* are in use, then additional software in the PDUs 4*a* keeps a heartbeat or keep-alive signal between the PDUs 4*a* to monitor the other PDUs 4*a* functional state.

In all figures, the systems of the DSAE system 1*a* (User 11*a*, Input 8*a*, Operational 9*a*, and Execution 10*a* systems) include the hardware modules of the system, which are referenced by 81*a* (Input Processing Unit, aka IPU), 91*a* (Operational Processing Unit, aka OPU), 101*a* (Execution Processing Unit, aka EPU), and 111*a* (User Processing Unit, aka UPU).

Although described with reference to embodiments, it should be readily apparent to those of ordinary skill in the art that various changes, modifications and substitutes are intended within the form and details thereof, without departing from the intended spirit and scope. Accordingly, it will be appreciated that in numerous instances some features will be employed without a corresponding use of other features. Further, those skilled in the art will understand that variations can be made in the number and arrangement of components illustrated in the above figures.

What is claimed is:

1. A method for providing security to a host endpoint device, the method comprising:
providing a security device configured to be connectable with the host endpoint device via a host interface to enable the security device to protect the host device, the host interface not being an external network connection, the security device including one or more input processing modules within an input system, one or more operational processing modules within an operational system, one or more execution processing modules within an execution system, and a multi-channel internal communication bus whereby at least one of the input processing modules, at least one of the operational processing modules, and at least one of the execution processing modules are coupled for data and control transmissions therebetween, and wherein the security device is adapted to communicate with the host endpoint device via the host interface and receive a plurality of external messages over a period of time at the one or more input processing modules, the multi-channel internal communications bus providing parallel communication lines to transfer data and control information between the input system, the operational system, and the execution system along different internal parallel paths within the security device, the input system, the operational system, the execution system, and the multi-channel internal communications bus residing within a physical casing or housing of the security device;
configuring the one or more input processing modules to each present a different attack surface at different intervals within the period of time to the received plurality of external messages from the host endpoint device, each different attack surface corresponding to a different processor executing a different instruction set and a different operating system; and
executing solely within the one or more execution processing modules a corresponding one of a plurality of applications.

2. The method of claim 1 wherein the security device implements a Dynamic Security Architecture Environment (DSAE) security architecture for the host endpoint device to use, the DSAE security architecture including logical software systems, the Operational System, the Execution System, the Input System, and a User System and their corresponding physical hardware modules, an Input Processing Unit (IPU), an Execution Processing Unit (EPU), an Operational Processing Unit (OPU), and a User Processing Unit (UPU), each of which reside inside the security device.

3. The method of claim 1 wherein the security device is powered by a source from the group consisting of at least one of: an external power distribution unit (PDU), an internal battery, an external battery, and the host endpoint device.

4. The method of claim 1 wherein the security device includes an external network interface, separate from the host interface, which can be a wired or wireless connection, the external network interface adapted to communicate with an external network directly from the security device, the external network interface not being used for changing the attack surface of the security device used by the host endpoint device.

5. The method of claim 1 including connecting at least one security device to the host endpoint device via the host interface.

6. The method of claim 1 including providing the security device with at least one Dynamic Security Architecture Environment (DSAE) security architecture system within the physical casing or housing of the security device.

7. The method of claim 1 including integrating or interfacing at least one authentication hardware component with the security device.

8. The method of claim 1 wherein the host interface between the host endpoint device and the security device is a wired or wireless data connection.

9. The method of claim 1 wherein each different attack surface is presented at different intervals by configuring the one or more execution processing modules within the execution system, each which have different hardware therein.

10. The method of claim 1 wherein each different attack surface is presented at different intervals by configuring the one or more operational processing modules.

11. The method of claim 1 wherein the security device includes one or more user processing modules within a user system.

12. The method of claim 11 wherein each different attack surface is presented at different intervals by configuring the one or more user processing modules within the user system.

13. A security device configured to provide security to a host endpoint device, the security device comprising:
   an input processor within an input system that includes one or more input processing modules within the input system that receives a plurality of external messages from the host endpoint device over a period of time at the one or more input processing modules within the input system, each of the one or more input processing modules within the input system being executable by a different processor and the different processor executing a different operating system that are each different from each other, and wherein the one or more input processing modules within the input system validate each of the plurality of external messages and invalidate an external attack;
   an operational processor within an operational system to configure the one or more input processing modules within the input system to each present a different attack surface at different intervals within the period of time to the received plurality of external messages from the host endpoint device, and thereby to present a different attack surface at different intervals to the external attack, each different attack surface corresponding to a different processor executing a different instruction set and a different operating system;
   an execution processor within an execution system that includes one or more execution processing modules and one or more processors that execute one or more applications;
   a multi-channel internal communication bus for connecting the input processor within the input system, the operational processor within the operational system, and the execution processor within the execution system for data and control transmissions therebetween, the multi-channel internal communications bus providing parallel communication lines to transfer data and control information between the input system, the operational system, and the execution system along different internal parallel paths within the security device, the input system, the operational system, the execution system, and the multi-channel internal communications bus residing within a physical casing or housing of the security device; and
   a host interface adapted to enable data communication between the security device and the host endpoint device and to receive the plurality of external messages from the host endpoint device over the period of time at the one or more input processing modules, the host interface not being an external network connection.

14. The security device of claim 13 wherein the security device implements a Dynamic Security Architecture Environment (DSAE) security architecture for the host endpoint device to use, the DSAE security architecture including logical software systems, the Operational System, the Execution System, the Input System, and a User System and their corresponding physical hardware modules, an Input Processing Unit (IPU), an Execution Processing Unit (EPU), an Operational Processing Unit (OPU), and a User Processing Unit (UPU), each of which reside inside the security device.

15. The security device of claim 13 being configured to be powered by a source from the group consisting of at least one of: an external power distribution unit (PDU), an internal battery, an external battery, and the host endpoint device.

16. The security device of claim 13 being configured with an external network interface, separate from the host interface, which can be a wired or wireless connection, the external network interface adapted to communicate with an external network directly from the security device, the external network interface not being used for changing the attack surface of the security device used by the host endpoint device.

17. The security device of claim 13 being configured to connect at least one security device to the host endpoint device via the host interface.

18. The security device of claim 13 being configured with at least one Dynamic Security Architecture Environment (DSAE) security architecture system within the physical casing or housing of the security device.

19. The security device of claim 13 being configured to interface with at least one authentication hardware component.

20. The security device of claim 13 wherein the host interface between the host endpoint device and the security device is a wired or wireless data connection.

21. The security device of claim 13 wherein each different attack surface is presented at different intervals by configuring the one or more execution processing modules within the execution system, each which have different hardware therein.

22. The security device of claim 13 wherein each different attack surface is presented at different intervals by configuring the one or more operational processing modules.

23. The security device of claim 13 wherein the security device includes one or more user processing modules within a user system.

24. The security device of claim 23 wherein each different attack surface is presented at different intervals by configuring the one or more user processing modules within the user system.

25. A method for providing security to a host endpoint device, the method comprising:
   providing a security device configured to be connectable with the host endpoint device via a host interface to enable the security device to protect the host device from cyber attacks, the host endpoint device being indirectly connected to an external communication network through the security device, the security device being directly connected to the external communication network via a wired or wireless network interface to further protect the host endpoint device, the security device including one or more input processing modules within an input system, one or more operational processing modules within an operational system, one or more execution processing modules within an execution system, and a multi-channel internal communication bus whereby at least one of the input processing modules, at least one of the operational processing modules, and at least one of the execution processing modules are coupled for data and control transmissions therebetween, and wherein the security device is adapted to communicate with the host endpoint device via the host interface and receive a plurality of external messages over a period of time at the one or more input processing modules, the multi-channel internal communications bus providing parallel communication lines to transfer data and control information between the input system, the operational system, and the execution system along different internal parallel paths within the security device, the input system, the operational system, the execution system, and the multi-channel internal communications bus residing within a physical casing or housing of the security device;

configuring the one or more input processing modules to each present a different attack surface at different intervals within the period of time to the received plurality of external messages from the host endpoint device, each different attack surface corresponding to a different processor executing a different instruction set and a different operating system; and executing solely within the one or more execution processing modules a corresponding one of a plurality of applications.

26. The method of claim 25 wherein the security device implements a Dynamic Security Architecture Environment (DSAE) security architecture for the host endpoint device to use, the DSAE security architecture including logical software systems, the Operational System, the Execution System, the Input System, and a User System and their corresponding physical hardware modules, an Input Processing Unit (IPU), an Execution Processing Unit (EPU), an Operational Processing Unit (OPU), and a User Processing Unit (UPU), each of which reside inside the security device.

27. The method of claim 25 wherein the security device is powered by a source from the group consisting of at least one of: an external power distribution unit (PDU), an internal battery, an external battery, and the host endpoint device.

28. The method of claim 25 including connecting at least one security device to the host endpoint device via the host interface.

29. The method of claim 25 including providing the security device with at least one Dynamic Security Architecture Environment (DSAE) security architecture system within the physical casing or housing of the security device.

30. The method of claim 25 including integrating or interfacing with at least one authentication hardware component with the security device.

31. The method of claim 25 wherein the host interface between the host endpoint device and the security device is a wired or wireless data connection.

32. The method of claim 25 wherein each different attack surface is presented at different intervals by configuring the one or more execution processing modules within the execution system, each which have different hardware therein.

33. The method of claim 25 wherein each different attack surface is presented at different intervals by configuring the one or more operational processing modules.

34. The method of claim 25 wherein the security device includes one or more user processing modules within a user system.

35. The method of claim 34 wherein each different attack surface is presented at different intervals by configuring the one or more user processing modules within the user system.

36. A security device configured to provide security to a host endpoint device, the security device comprising:

an input processor within an input system that includes one or more input processing modules within the input system that receives a plurality of external messages from the host endpoint device over a period of time at the one or more input processing modules within the input system, each of the one or more input processing modules within the input system being executable by a different processor and the different processor executing a different operating system that are each different from each other, and wherein the one or more input processing modules within the input system validate each of the plurality of external messages and invalidate an external attack;

an operational processor within an operational system to configure the one or more input processing modules within the input system to each present a different attack surface at different intervals within the period of time to the received plurality of external messages from the host endpoint device, and thereby to present a different attack surface at different intervals to the external attack, each different attack surface corresponding to a different processor executing a different instruction set and a different operating system;

an execution processor within an execution system that includes one or more execution processing modules and one or more processors that execute one or more applications;

a multi-channel internal communication bus for connecting the input processor within the input system, the operational processor within the operational system, and the execution processor within the execution system for data and control transmissions therebetween, the multi-channel internal communications bus providing parallel communication lines to transfer data and control information between the input system, the operational system, and the execution system along different internal parallel paths within the security device, the input system, the operational system, the execution system, and the multi-channel internal communications bus residing within a physical casing or housing of the security device; and a host interface adapted to enable data communication between the security device and the host endpoint device, to enable the security device to change the attack surface, and to receive the plurality of external messages from the host endpoint device over the period of time at the one or more input processing modules, the host endpoint device being indirectly connected to an external communication network through the security device, the security device being directly connected to the external communication network via a wired or wireless network interface.

37. The security device of claim 36 wherein the security device implements a Dynamic Security Architecture Environment (DSAE) security architecture for the host endpoint device to use, the DSAE security architecture including logical software systems, the Operational System, the Execution System, the Input System, and a User System and their corresponding physical hardware modules, an Input Processing Unit (IPU), an Execution Processing Unit (EPU), an Operational Processing Unit (OPU), and a User Processing Unit (UPU), each of which reside inside the security device.

38. The security device of claim 36 being configured to be powered by a source from the group consisting of at least one of: an external power distribution unit (PDU), an internal battery, an external battery, and the host endpoint device.

39. The security device of claim 36 being configured to connect at least one security device to the host endpoint device via the host interface.

40. The security device of claim 36 being configured with at least one Dynamic Security Architecture Environment (DSAE) security architecture system within the physical casing or housing of the security device.

41. The security device of claim 36 being configured to interface with at least one authentication hardware component.

42. The security device of claim 36 wherein the host interface between the host endpoint device and the security device is a wired or wireless data connection.

43. The security device of claim 36 wherein each different attack surface is presented at different intervals by configuring the one or more execution processing modules within the execution system, each which have different hardware therein.

44. The security device of claim 36 wherein each different attack surface is presented at different intervals by configuring the one or more operational processing modules.

45. The security device of claim 36 wherein the security device includes one or more user processing modules within a user system.

46. The security device of claim 45 wherein each different attack surface is presented at different intervals by configuring the one or more user processing modules within the user system.

* * * * *